(12) United States Patent
Zhang et al.

(10) Patent No.: US 11,619,317 B2
(45) Date of Patent: Apr. 4, 2023

(54) ELECTRICALLY OPERATED VALVE

(71) Applicant: ZHEJIANG SANHUA INTELLIGENT CONTROLS CO., LTD, Zhejiang (CN)

(72) Inventors: Rongrong Zhang, Zhejiang (CN); Dazhao Zha, Zhejiang (CN); Yingchong Lu, Zhejiang (CN); Lei Zhou, Zhejiang (CN)

(73) Assignee: ZHEJIANG SANHUA INTELLIGENT CONTROLS CO., LTD., Zhejiang (CN)

( * ) Notice: Subject to any disclaimer, the term of this patent is extended or adjusted under 35 U.S.C. 154(b) by 7 days.

(21) Appl. No.: 17/252,477

(22) PCT Filed: Jun. 14, 2019

(86) PCT No.: PCT/CN2019/091238
§ 371 (c)(1),
(2) Date: Dec. 15, 2020

(87) PCT Pub. No.: WO2019/238116
PCT Pub. Date: Dec. 19, 2019

(65) Prior Publication Data
US 2021/0254742 A1 Aug. 19, 2021

(30) Foreign Application Priority Data

Jun. 15, 2018 (CN) .......................... 201810617774.7
Jun. 15, 2018 (CN) .......................... 201820929527.6

(51) Int. Cl.
*F16K 27/10* (2006.01)
*F16K 24/04* (2006.01)
(Continued)

(52) U.S. Cl.
CPC ............ *F16K 27/102* (2013.01); *F16K 24/04* (2013.01); *F16K 27/029* (2013.01); *F16K 31/0655* (2013.01)

(58) Field of Classification Search
CPC ...... F16K 24/04; F16K 27/029; F16K 27/102; F16K 31/04; F16K 31/0655;
(Continued)

(56) References Cited

U.S. PATENT DOCUMENTS 9,512,963 B2 * 12/2016 Conley ................ F16K 31/508
9,541,315 B2 * 1/2017 Zhan ...................... F25B 41/35

FOREIGN PATENT DOCUMENTS

CN 207049366 U 2/2013
CN 107061816 A 8/2017
(Continued)

OTHER PUBLICATIONS

EPO, application EP 19 82 028; Annex to the European Search Report, dated Jan. 26, 2022, pp. 1-3 (Year: 2022).*
(Continued)

*Primary Examiner* — Matthew W Jellett
(74) *Attorney, Agent, or Firm* — Crain Caton and James; William P. Jensen

(57) ABSTRACT

An electrically operated valve includes a rotor, a stator assembly, a sleeve, a valve assembly, a box body, a circuit board assembly, and a valve port. The stator assembly is disposed outside the rotor, and the stator assembly includes a coil assembly. The sleeve is configured to isolate the stator assembly from the rotor. The valve assembly includes a spool. The box body has a cavity, and the circuit board assembly is accommodated in the cavity. The rotor is configured to drive the spool to move close to or away from the valve port.

19 Claims, 14 Drawing Sheets

(51) Int. Cl.
*F16K 27/02* (2006.01)
*F16K 31/06* (2006.01)

(58) Field of Classification Search
CPC ........ F16K 31/508; H02K 5/10; H02K 5/128;
H02K 5/225; H02K 7/06; H02K 11/33;
H02K 2205/09; H02K 2211/03
See application file for complete search history.

(56) References Cited

FOREIGN PATENT DOCUMENTS

| | | | | | |
|---|---|---|---|---|---|
| CN | 107345590 | A | | 11/2017 | |
| CN | 207049366 | U | * | 2/2018 | ............ F16K 11/044 |
| CN | 107795724 | A | | 3/2018 | |
| EP | 0417344 | A1 | | 3/1991 | |
| FR | 2752907 | A1 | | 3/1998 | |
| FR | 2752907 | B1 | * | 3/1998 | .............. F16L 55/10 |
| FR | 3036674 | A1 | | 12/2016 | |
| JP | 5627188 | B2 | | 10/2014 | |
| KR | 101457051 | B1 | | 11/2014 | |

OTHER PUBLICATIONS

Yingzhuang, Sun, International Search Report for PCT App. No. PCT/CN2019/091238, dated Sep. 20, 2019, 4 pages, China National Intellectual Property Administration, China.
Florin Zavelcuta, Communication pursuant to Rule 164(1)EPC, EP Application No. 19820208.7, dated Feb. 3, 2022, 19 pages, European Patent Office, Munich Germany.

* cited by examiner

ELECTRICALLY OPERATED VALVE

CROSS-REFERENCE TO RELATED APPLICATIONS

This application is a U.S. National Stage Application of PCT Application Serial Number PCT/CN2019/091238, which claims priority to Chinese Patent Application No. 201810617774.7 filed Jun. 15, 2018, and Chinese Patent Application No. 201820929527.6 filed Jun. 15, 2018, the disclosures of which are incorporated herein by reference in their entireties.

TECHNICAL FIELD

The present disclosure relates to the technical field of fluid control, for example, to an electrically operated valve.

BACKGROUND

With the improvement of the requirement for control accuracy, an electrically operated valve serving as a flow regulating device is gradually adopted. To facilitate control, the electrically operated valve includes at least a circuit board assembly, and to prevent the circuit board assembly from being corroded, the circuit board assembly needs to be sealed. Usually, the circuit board assembly is disposed in a box body, and the circuit board assembly is connected to the box body by welding or using a thread, so an assembly process of the circuit board assembly is relatively complicated.

Moreover, if the box body is hermetic and the air humidity in the box body is relatively high, a condensation phenomenon may occur due to the temperature change, which will result in a relatively poor working environment of the circuit board assembly and may cause adverse effects on the circuit board assembly.

SUMMARY

The present disclosure provides an electrically operated valve, and the electrically operated valve can improve a working environment of a circuit board assembly.

One embodiment provides an electrically operated valve including a rotor, a stator assembly, a sleeve, a valve assembly, a box body, a circuit board assembly, and a valve port. The stator assembly is disposed outside the rotor, and the stator assembly includes a coil assembly. The sleeve is configured to isolate the stator assembly from the rotor. The valve assembly is partially disposed in the sleeve and includes a spool. The box body has a cavity, the circuit board assembly is accommodated in the cavity, and the box body is disposed at one side of the rotor. The valve port is disposed below the stator assembly and the rotor. The rotor is configured to drive the spool to move close to or away from the valve port. The electrically operated valve further includes a waterproof and breathable membrane, the box body includes a communication passage, and the waterproof and breathable membrane includes a fixed connection portion and a ventilation portion. The fixed connection portion is fixed to the box body, the cavity is configured to communicate with gas outside the box body through the ventilation portion and the communication passage, such that water outside the box body is not able to enter the cavity through the waterproof and breathable membrane. The fixed connection portion is fixed to the box body by hot-pressing, welding or fixing glue.

DETAILED DESCRIPTION

The electrically operated valve in this embodiment is mainly used in a refrigerating system, specifically, in the flow control catchment, and the electrically operated valve can adjust a flow rate of working medium in the refrigerating system.

Figure 1:
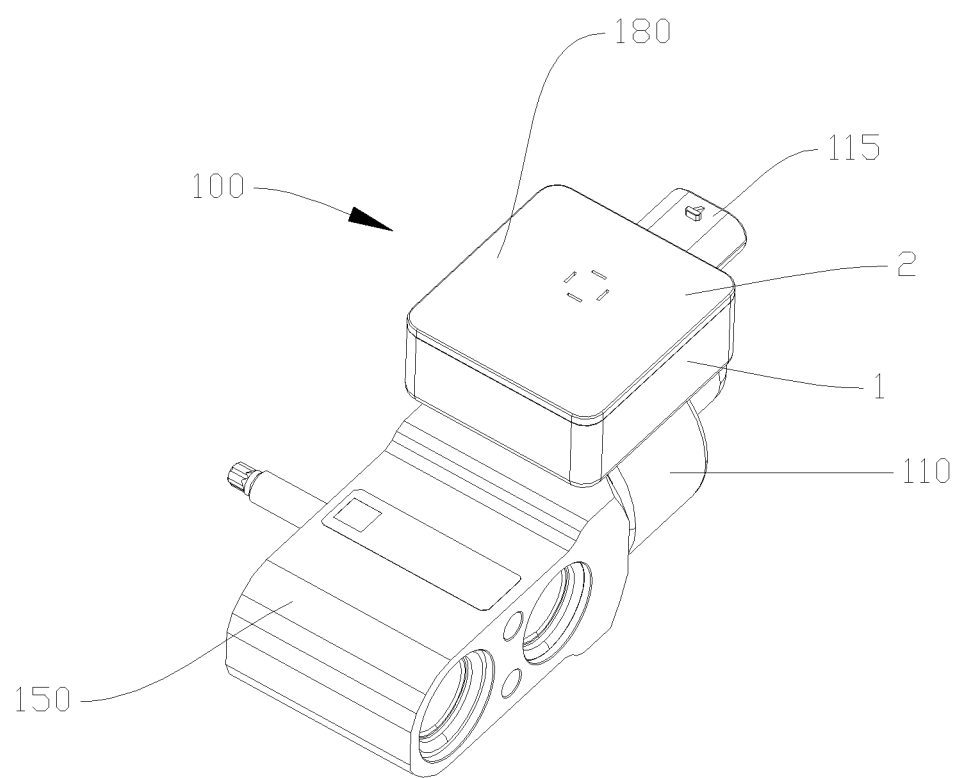
FIG. 1 is a perspective view from one viewing angle of a first embodiment of an electrically operated valve according to one embodiment.
Figure 2:
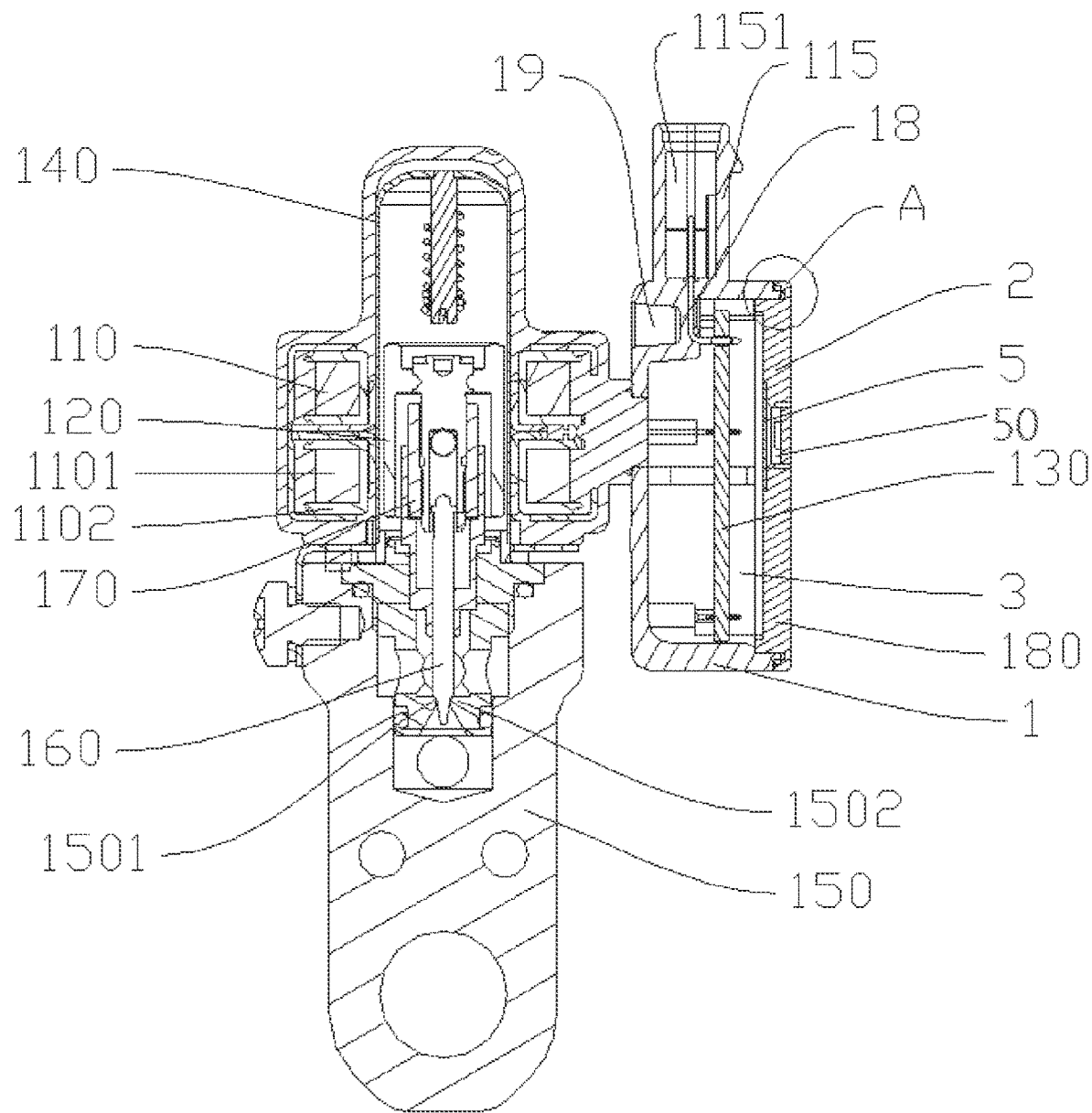
FIG. 2 is a sectional view of the electrically operated valve of FIG. 1 from one viewing angle.

Referring to FIG. 1 and FIG. 2, the electrically operated valve 100 includes a stator assembly 110, a rotor 120, a circuit board assembly 130, a sleeve 140, a valve body 150, and a valve assembly. The stator assembly 110 includes a coil assembly 1101 and a coil framework 1102, and the coil framework 1102 provides support for the winding of the coil assembly 1101. The valve assembly includes a spool 160 and a transmission 170. The valve body 150 has a first flow passage and a second flow passage, the first flow passage is communicated with the second flow passage through a valve port 1501, and the valve port 1501 may be formed in the valve body 150 or a component having the valve port 1501 is fixed to the valve body 150. In this embodiment, a valve seat 1502 having the valve port 1501 is fixed to the valve body 150, which facilitates processing of the valve port. In this embodiment, the stator assembly 110 is disposed on an outer periphery of the rotor 120, the sleeve 140 isolates the stator assembly 110 from the rotor 120, that is, the stator assembly 110 is disposed outside the sleeve 140, and the rotor 120 is disposed inside the sleeve 140; the coil assembly 1101 of the stator assembly 110 is electrically connected to the circuit board assembly 130, and when a predetermined timing current is applied to the coil assembly 1101, the rotor 120 rotates in an excited magnetic field generated by the stator assembly 110, rotation of the rotor 120 is converted into an axial movement of the spool 160 through the transmission 170 so that the rotor 120 can drive the spool 160 to move. When the spool 160 moves closer to or away from the valve port 1501, a flow cross-sectional area of the valve port 1501 changes, thus changing a communication cross-sectional area of the first flow passage and the second flow passage, and further adjusting the flow rate of a system in which the electrically operated valve 100 is located.

Figure 3:
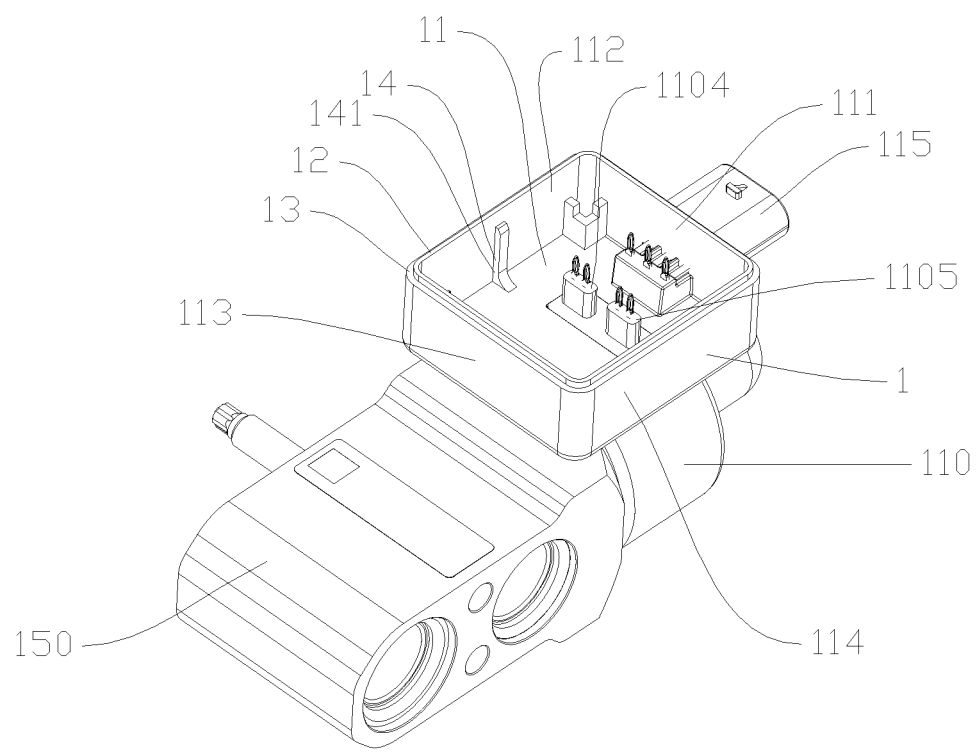
FIG. 3 is a structure view of the electrically operated valve of FIG. 1 with a second housing and a circuit board assembly removed from one viewing angle.
Figure 4:
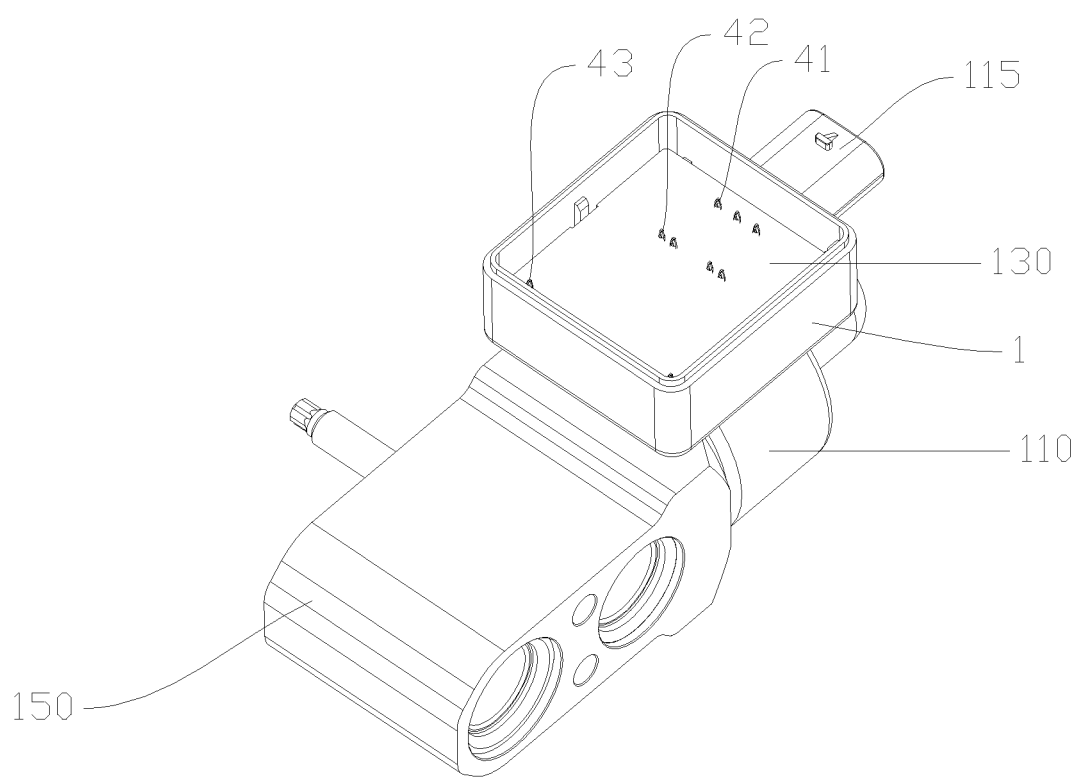
FIG. 4 is a structure view of the electrically operated valve of FIG. 1 with a second housing removed from one viewing angle.
Figure 5:
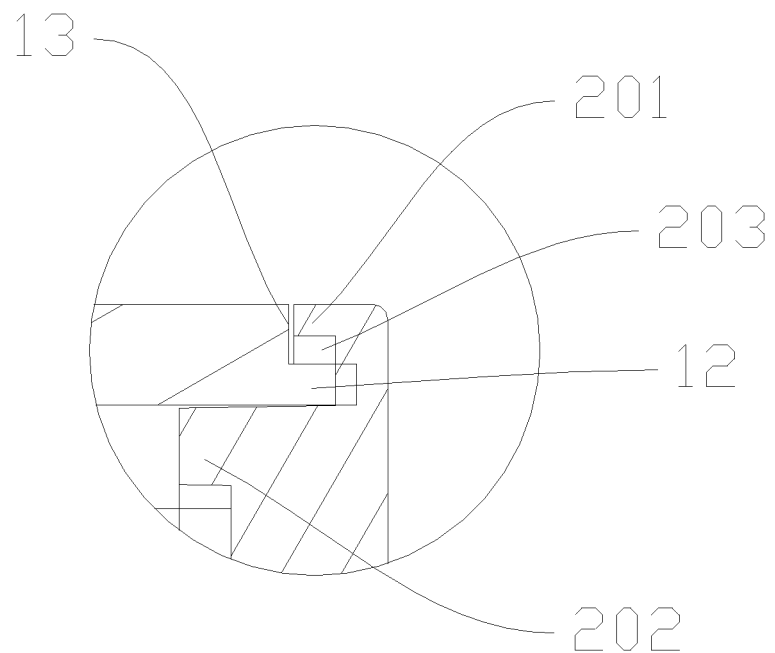
FIG. 5 is an enlarged schematic view showing a structure of region A in FIG. 2.
Figure 6:
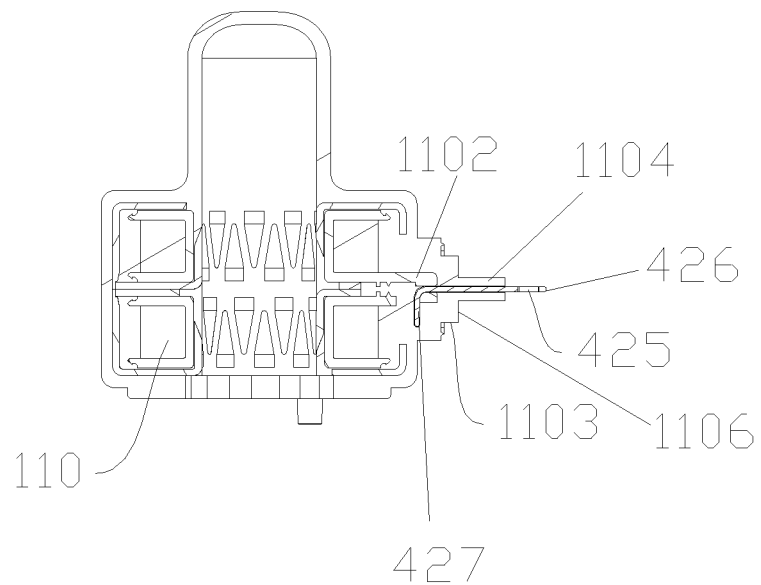
FIG. 6 is a cross-sectional view of a stator assembly of FIG. 1.
Figure 17:
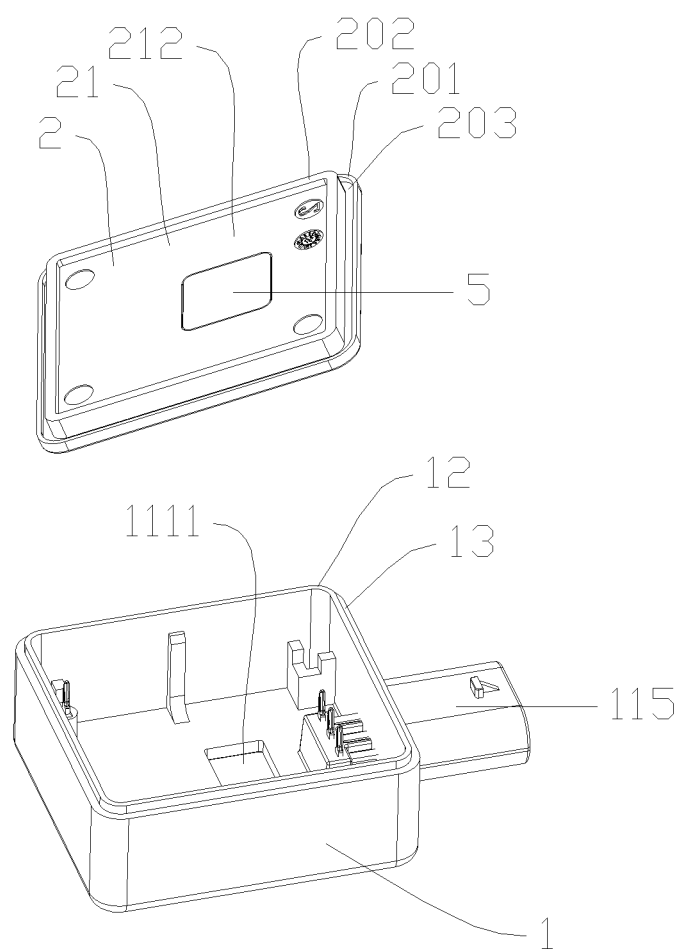
FIG. 17 is an exploded structure view of a first housing and a second housing of FIG. 16.
Figure 22:
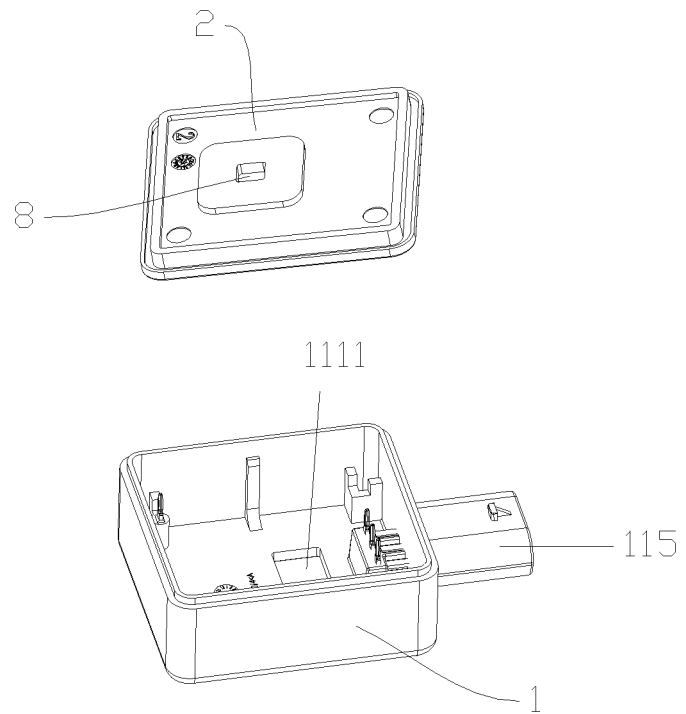
FIG. 22 is an exploded structure view of a first housing and a second housing of FIG. 21.

The electrically operated valve 100 further includes a box body 180, the box body 180 includes a cavity 3, and the circuit board assembly 130 is accommodated in the cavity 3, thereby reducing the corrosion of the circuit board assembly by the outside world. In this embodiment, the box body 180 includes a first housing 1 and a second housing 2. Referring to FIG. 3, the first housing 1 includes a bottom wall 11 and a side wall, the side wall extends from the bottom wall 11 to one side, the side wall includes a first side wall 111, a second side wall 112, a third side wall 113 and a fourth side wall 114, the first side wall 111 and the third side wall 113 are disposed opposite to each other, the second side wall 112 and the fourth side wall 114 are disposed opposite to each other, the first housing 1 is connected to the second housing 2 so as to form the cavity 3, and the circuit board assembly 130 is accommodated in the cavity 3. In this embodiment, the first housing 1 and the second housing 2 are both injection molded, where the second housing 2 is injection molded, the first housing 1 is injection molded with a pin as an insert, the first housing 1 is fixed to the stator assembly 110 by welding, the first housing 1 is fixed to the second housing 2 by welding, such as laser welding or ultrasonic welding, and both the two welding modes do not need solder, which can further prevent the influence of solder impurities on cavity cleanliness; and the first housing 1 is fixed to the stator assembly 110 by welding, and the first housing 1 is fixed to the second housing 2 by welding, so that molds of the first housing 1, the second housing 2 and the stator assembly 110 are relatively simple, which is beneficial to reducing the cost. In this embodiment, as shown in FIG. 6, the stator assembly 110 includes a connection and limiting portion 1103, the connection and limiting portion 1103 is formed by protruding outwardly from a main body of the stator assembly 110, and the connection and limiting portion 1103 and an injection-molded insulating portion of the stator assembly 110 are integrally formed. The bottom wall 11 of the first housing 1 is provided with an opening 1111 (as shown in FIG. 17 and FIG. 22), the connection and limiting portion 1103 extends into the cavity 3 through the opening 1111 of the bottom wall 11, the first housing 1 is fixed to the connection and limiting portion 1103 by welding, and the welding mode includes the ultrasonic welding. In this embodiment, the connection and limiting portion 1103 includes a step portion 1106, a second protruding portion 1104 and a third protruding portion 1105. The second protruding portion 1104 and the third protruding portion 1105 are disposed on a top of the step portion 1106, the step portion 1106 is in contact with and limited to an outer side of the first housing 1, the step portion 1106 is fixed to and sealed with an outer periphery of the first housing 1 by welding, the second protruding portion 1104 and the third protruding portion 1105 stick into the cavity 3 through the opening 1111, and the second protruding portion 1104 and the third protruding portion 1105 are fixed with pins. In this embodiment, the first housing 1 is fixed to the second housing 2 by laser welding. Referring to FIG. 3, the first housing 1 includes a welding rib 12 and a first abutting surface 13, and the first abutting surface 13 is disposed on an outer periphery of the welding rib 12; and the welding rib 12 and the first abutting surface 13 are disposed on top ends of the first side wall 111, the second side wall 112, the third side wall 113, and the fourth side wall 114. In conjunction with FIG. 3, FIG. 5 and FIG. 17, the second housing 2 includes an outer edge portion 201, a first limiting rib 202, and an overflow groove 203, the overflow groove 203 is formed between the outer edge portion 201 and the first limiting rib 202, after the first housing 1 and the second housing 2 are assembled, the welding rib 12 is located in the overflow groove 203, and an outer side of the first limiting rib 202 abuts against an inner side of a side wall of the first housing 1 to restrict the movement of the second housing 2 in a transverse direction relative to the first housing 1; and during welding, the first housing 1 and the second housing 2 are positioned and butted together, the welding rib 12 is fused by laser, and a pressure is applied to the first housing 1 and the second housing 2, so that the welding rib 12 is fused and overflows into the overflow groove 203, and the first abutting surface 13 abuts against or is in clearance fit with an end surface of the outer edge portion 201, thus completing the welding and fixing of the first housing 1 to the second housing 2. Such a sealing structure can satisfy the requirements of sealing, and is simple in structure and process. In this embodiment, the first housing 1 is fixed to the connection and limiting portion 1103 by ultrasonic welding, then the circuit board assembly 130 is assembled with the pin, and the first housing 1 and the second housing 2 are welded by laser. In one embodiment, the first housing 1 and the connection and limiting portion 1103 may be welded by laser, and the first housing 1 and the second housing 2 may also be welded by laser. In other embodiments, the first housing 1 and the connection and limiting portion 1103 may be welded by ultrasonic as required, and the first housing 1 and the second housing 2 may also be welded by ultrasonic as required. In other embodiments, the first housing 1 may also be formed integrally with the stator assembly 110 by injection molding, where the first housing 1 may be integrally injection molded through an insulating portion of the stator assembly 110, which is beneficial to the improvement of the sealing property between the first housing 1 and the stator assembly 110.

Referring to FIG. 1 to FIG. 3, the box body 180 further includes a plug-in portion 115, the plug-in portion 115 and the first housing 1 are integrally formed, and the plug-in portion 115 includes a plug-in cavity 1151. When an external plug is inserted into the plug-in cavity 1151 and is limited to the plug-in portion 115, and an external signal is extended into the plug-in cavity 1151 through a plug and electrically connected to the pin. In this embodiment, the plug-in portion 115 is formed on the first side wall 111, and the plug-in portion 115 and the first side wall 111 are integrally formed.

Figure 7:
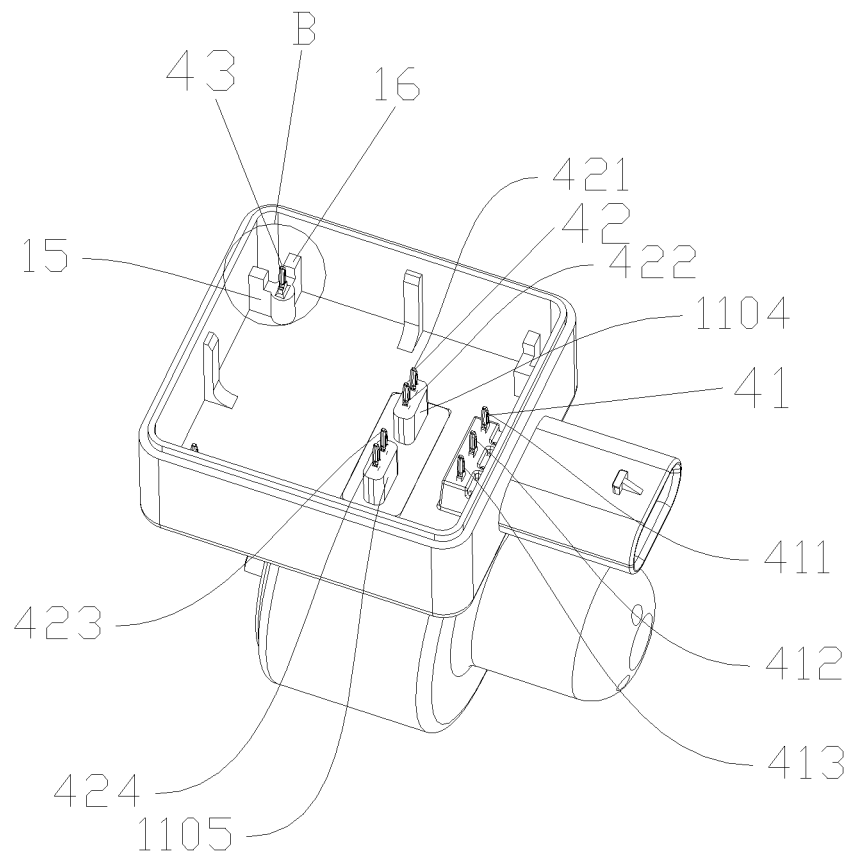
FIG. 7 is a structure view from one viewing angle of a combined structure of a stator assembly and a first housing.
Figure 8:
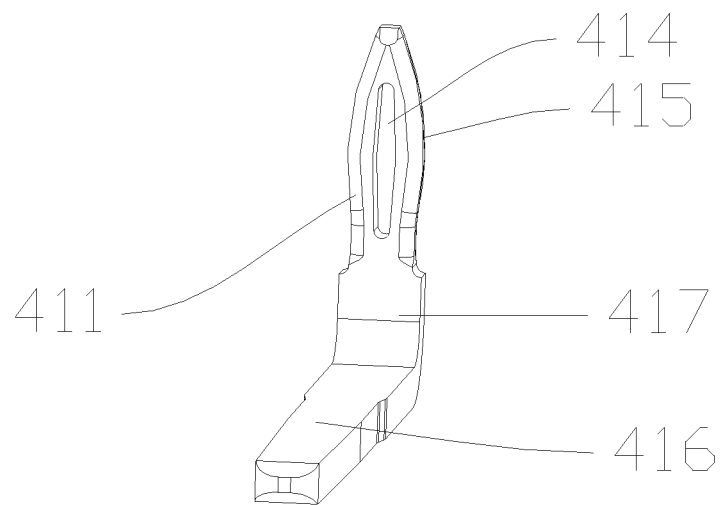
FIG. 8 is a structure view of a first pin of FIG. 7.

The electrically operated valve 100 includes pins, and one ends of all pins are connected to the circuit board assembly 130. The pins in this embodiment are all press-fit pins, and the pins are connected to the circuit board assembly 130 by the press-fit technology, so that the connection of the pins to the circuit board assembly 130 does not require welding. Referring to FIG. 7, in this embodiment, the pins are divided into three groups according to different application scenarios of the pins, which respectively are a first group of pins 41, a second group of pins 42 and a third group of pins 43. The first group of pins 41 are fixed to the box body 180, the third group of pins 43 are fixed to the box body 180, and the second group of pins 42 are fixed to the stator assembly 110. The first group of pins 41 are disposed close to one side wall of the box body 180, the third group of pins 43 are disposed close to the other opposite side wall, and the second group of pins 42 are disposed between the first group of pins 41 and the third group of pins 43. The first group of pins 41 are configured to connect an external signal to the circuit board assembly 130, the second group of pins 42 are configured to connect the stator assembly 110 and the circuit board assembly 130, and the third group of pins 43 provide partial positioning or support for the circuit board assembly 130 to be supported on the box body 180. In this embodiment, the first group of pins 41 are disposed close to the first side wall 111 of the box body 180, and the third group of pins 43 are disposed close to the third side wall 113 of the box body 180. The first group of pins 41 are fixed to the first side wall 111 by injection molding, and the third group of pins 43 are fixed to the first housing 1 by injection molding. A bottom wall 11 is provided with an opening 1111, and the stator assembly 110 includes the connection and limiting portion 1103. The second group of pins 42 are fixed to the connection and limiting portion 1103 by injection molding, the connection and limiting portion 1103 sticks into the cavity 3 through the opening 1111, and the connection and limiting portion 1103 is fixed to the first housing 1 by welding. Each of the first group of pins 41 includes a first press-fitting portion 415, a first connecting portion 416 and a first fixing portion 417, the first fixing portion 417 is fixed to the first housing 1 by injection molding, and the first press-fitting portion 415 has a first needle eye 414. The circuit board assembly 130 includes a first group of connection holes, the first group of connection holes include a first connection hole, a second connection hole and a third connection hole, and first press-fitting portions 415 are respectively pressed into the first group of connection holes and electrically connected to the circuit board assembly 130. The first group of pins 41 include a first pin 411, a second pin 412 and a third pin 413, and the first pin 411, the second pin 412 and the third pin 413 are spaced apart in a same row. Structures of the first pin 411, the second pin 412 and the third pin 413 are the same, and the first pin 411 will be described as an example below. Referring to FIG. 8, the first pin 411 includes a first press-fitting portion 415, a first connecting portion 416 and a first fixing portion 417, the first connecting portion 416 is disposed substantially perpendicularly to the first press-fitting portion 415, and the first fixing portion 417 is connected to the first connecting portion 416 and the first press-fitting portion 415. The first press-fitting portion 415 has a first needle eye 414, so that when the first press-fitting portion 415 is in press-fit with the circuit board assembly 130, the first press-fitting portion 415 can have a certain amount of elastic deformation, which is beneficial to the assembly and does not cause damage to the circuit board assembly 130 due to press-fitting. The first connecting portion 416 sticks into the plug-in cavity 1151 of the plug-in portion 115, the first press-fitting portion 415 sticks into the cavity 3, the circuit board assembly 130 is fixed to the first press-fitting portion 415 by press-fitting and electrically connected to the first press-fitting portion 415, and a part of the first fixing portion 417 is fixed to the first housing 1 by injection molding. The circuit board assembly 130 has a first connection hole, a second connection hole and a third connection hole, and the first press-fitting portion 415 is pressed into the first connection hole, so that the first pin 411 and the circuit board assembly 130 do not need to be welded; and meanwhile the second pin 412 is pressed into a corresponding second through hole, and the third pin 413 is pressed into a corresponding third through hole. In this way, the three pins are connected to the circuit board assembly 130. Compared with using common pins, this embodiment can omit a welding step, so that solder paste, flux and the like do not need to be used, pollution sources are eliminated from the source, and meanwhile the press-fitting is simple, which is beneficial to simplification of the assembly process of the circuit board assembly and can shorten the processing time of the electrically operated valve 100. At the same time, for the circuit board assembly 130, the first group of pins 41 also play a supporting and fixing role, thereby reducing the loosening of the circuit board assembly 130 due to vibration, making the structure relatively stable and improving the reliability of the system.

Referring to FIG. 2 and FIG. 8, in this embodiment, the first fixing portion 417 of the first pin 411 is disposed at a preset distance from the bottom wall 11 of the first housing 1. In order to improve connection the strength between the first fixing portion 417 and the first housing 1, the bottom wall 11 of the first housing 1 protrudes toward the cavity 3 of the first housing 1 to form a first protruding portion 18, the first protruding portion 18 is injection-molded to cover a portion of each of the first group of pins 41, and the first fixing portion 417 is fixed to the first protruding portion 18 by injection molding. In order to ensure a relatively uniform wall thickness of the first housing 1, the first housing 1 has a concave portion 19 corresponding to the first protruding portion 18, and the concave portion 19 is recessed from the outside of the first housing 1 to an inner cavity of the first housing 1, so that the first housing 1 shrinks uniformly after being molded, thereby reducing deformation of the first housing 1.

Figure 9:
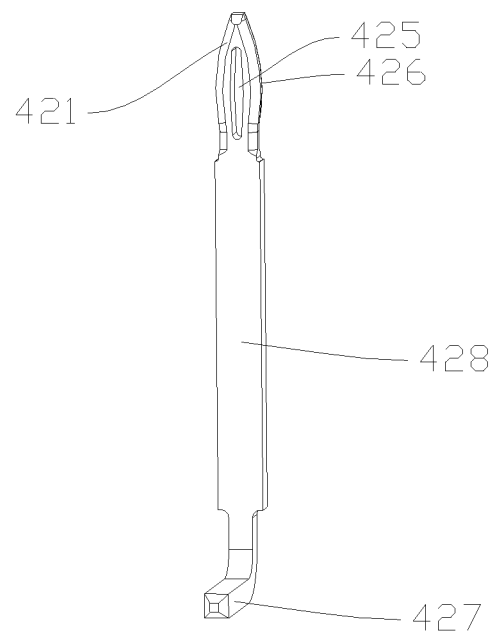
FIG. 9 is a structure view of a fourth pin of FIG. 7.

Referring to FIG. 7 and FIG. 9, each of the second group of pins 42 includes a second press-fitting portion 426, a second connecting portion 427 and a second fixing portion 428, the second fixing portion 428 is fixed to the first housing 1 by injection molding, the second press-fitting portion 426 has a second needle eye 425, the circuit board assembly 130 includes a second group of connection holes, the second group of connection holes includes a fourth connection hole, a fifth connection hole, a sixth connection hole and a seventh connection hole, and the second press-fitting portions 426 are respectively pressed into the second group of connection holes and electrically connected to the circuit board assembly 130. The second group of pins 42 include a fourth pin 421, a fifth pin 422, a sixth pin 423, and a seventh pin 424. The fourth pin 421 and the fifth pin 422 are fixed to the second protruding portion 1104 by injection molding, the sixth pin 423 and the seventh pin 424 are fixed to the third protruding portion 1105 by injection molding, and the second protruding portion 1104 and the third protruding portion 1105 are spaced apart from each other a predetermined distance. In this embodiment, each of the second group of pins 42 has a same structure, and the fourth pin 421 will be described as an example below. Referring to FIG. 9, the fourth pin 421 includes a second press-fitting portion 426, a second connecting portion 427 and a second fixing portion 428, where the second connecting portion 427 is disposed substantially perpendicularly to the second fixing portion 428, the second fixing portion 428 and the second press-fitting portion 426 are located on the same plane, and the second press-fitting portion 427 has a second needle eye 425, so that when the second press-fitting portion 426 is press-fit with the circuit board assembly 130, the second press-fitting portion 426 can have a certain amount of elastic deformation, which is beneficial to assembly and does not cause damage to the circuit board assembly 130 due to press-fitting. The circuit board assembly 130 has a fourth connection hole, and the second press-fitting portion 426 is pressed into the fourth connection hole to be limited to the circuit board assembly 130 and electrically connected to the circuit board assembly 130. As shown in FIG. 6, the second connecting portion 427 is fixed and electrically connected to the coil assembly 1101, and the second fixing portion 428 is fixed to the connection and limiting portion 1103 by injection molding. In this embodiment, the second connecting portion 427 and the second fixing portion 428 are both wrapped by the second protruding portion 1104, the second connecting portion 427 is electrically connected to the coil assembly 1101, the second connecting portion is connected to the coil framework 1102 in a position limit, and the second connecting portion 427 is fixedly connected by an injection molding portion. At the same time, the fifth pin 422, the sixth pin 423, and the seventh pin 424 are also pressed into the fifth connection hole, the sixth connection hole, and the seventh connection hole of the circuit board assembly 130 which are respectively corresponding to the fifth pin 422, the sixth pin 423, and the seventh pin 424. In this way, compared with using common pins, this embodiment can omit a welding step, so that solder paste, flux and the like do not need to be used, pollution sources are eliminated from the source, and meanwhile the press-fitting is simple, which is beneficial to simplification of the assembly process of the circuit board assembly and can shorten processing time of the electrically operated valve 100. At the same time, the circuit board assembly 130 is supported and fixed, thereby making the structure relatively stable and improving the reliability of the system. The number of the second group of pins is not limited to four, and may be five or six.

In this embodiment, the plug-in portion 115 is disposed on the first side wall 111 of the first housing 1, the first group of pins 41 are disposed close to the first side wall 111 of the first housing 1, the third group of pins 43 are disposed close to the third side wall 113 opposite to the first side wall 111, the third group of pins 43 are configured to limit or position the circuit board assembly 130, and the second group of pins 42 are disposed between the first group of pins 41 and the third group of pins 43, that is, the second group of pins 42 are disposed approximately centrally on the bottom wall 11, so that three supports are formed for the circuit board assembly 130 and the circuit board assembly 130 is more stable.

Figure 10:
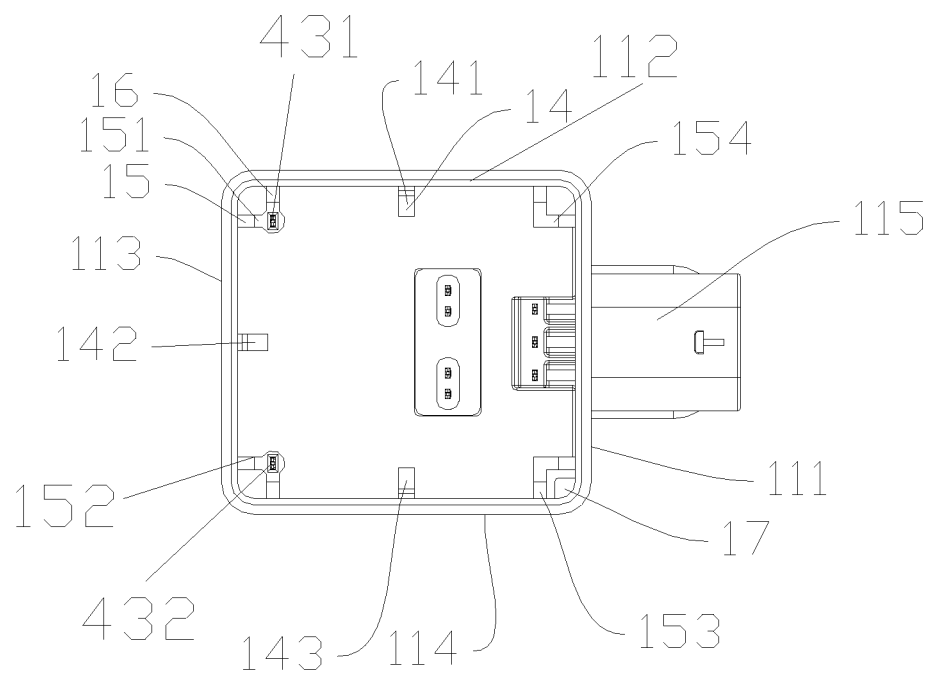
FIG. 10 is a front structure view of FIG. 7.
Figure 11:
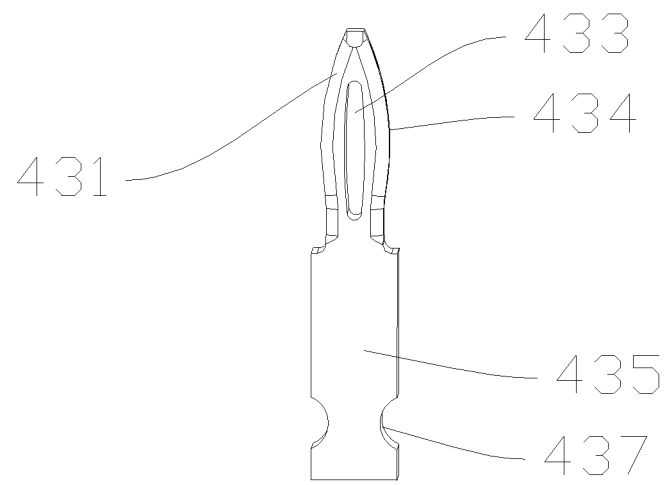
FIG. 11 is a structure view of an eighth pin of FIG. 7.

Referring to FIG. 7, FIG. 10 and FIG. 11, each of the third group of pins 43 include a third press-fitting portion 434 and a third fixing portion 435, the third press-fitting portion 434 has a third needle eye 433, the circuit board assembly 130 includes a third group of connecting holes, the third group of connecting holes include an eighth connecting hole and a ninth connecting hole, and third press-fitting portions 434 are pressed into the third group of connecting holes and are fixedly connected to the circuit board assembly 130. The third group of pins 43 include an eighth pin 431 and a ninth pin 432, where the eighth pin 431 is disposed close to a corner formed by the second side wall 112 and the third side wall 113, the ninth pin 432 is disposed close to a corner formed by the third side wall 113 and the fourth side wall 114, each of the third group of pins 43 has a same structure, and the eighth pin 431 will be described as an example below. Referring to FIG. 11, the eighth pin 431 includes a third press-fitting portion 434 and a third fixing portion 435, the third press-fitting portion 434 and the third fixing portion 435 are in a same plane, and the third press-fitting portion 434 has a third needle eye 433, so that when the third press-fitting portion 434 is press-fit with the circuit board assembly 130, the third press-fitting portion 434 can have a certain amount of elastic deformation, which is beneficial to assembly and does not cause damage to the circuit board assembly due to press-fitting; the circuit board assembly 130 has an eighth connecting hole, the third press-fitting portion 434 is pressed into the eighth connecting hole so as to be connected to the circuit board assembly 130, and the third fixing portion 435 is fixed to the first housing 1 by injection molding; and the box body includes a plurality of bases 15, the plurality of bases include a first base 151, a second base 152, a third base 153 and a fourth base 154, and a part of the third fixing portion 435 is fixed to at least part of the bases 15 by injection molding or is fixedly connected to the at least part of the bases 15. In this embodiment, the part of the third fixing portion 435 is fixed to the first base 151 by injection molding or is fixedly connected to the first base 151. The eighth pin 431 further includes a detachment preventing portion 437, the detachment preventing portion 437 is an annular groove formed on the third fixing portion 435, and after the eighth pin 431 and the first housing 1 are injection molded, a part of the first housing 1 enters the annular groove so as to prevent the eighth pin 431 from falling off. At the same time, the ninth pin 432 is pressed into the ninth connecting hole of circuit board assembly 130 corresponding to the ninth pin 432 so as to support and fix the circuit board assembly 130 far away from the first side wall 111, so that the structure is relatively stable and the reliability of the system is improved. At the same time, by adding the third group of pins 43, the stability of the force under press fitting can be improved, thereby improving the reliability of the system. The pins of this embodiment include but are not limited to the above-mentioned nine pins, which can be appropriately increased or decreased according to needs. For example, the third group of pins 43 include, but are not limited to, the eighth pin and the ninth pin, a pin that plays a supporting and fixing role can be added at a corner position close to the first side wall 111 so as to make the structure more stable, thus improving the stability of the force under press fitting; and it is beneficial to simplify the assembly process of the circuit board assembly, thereby improving the reliability of the system. In one embodiment, the third group of pins 43 may also be one pin, which is configured to support the circuit board assembly 130. The circuit board assembly 130 and the pin are fixed and limited by press fitting, so that the welding is not required, thereby effectively reducing solder impurities, facilitating cleanliness of the box body, and improving the working environment of the circuit board assembly. In other embodiments, the third group of pins 43 may not have the third needle eye.

In this embodiment, by providing the third group of pins 43, the force on the circuit board assembly 130 during press-fitting can be more uniform. In other embodiments, instead of providing the third group of pins 43, the first group of pins 41 and the second group of pins 42 are arranged symmetrically, and the force on the circuit board assembly 130 may be more uniform during press-fitting. In one embodiment, the third group of pins 43 may be arranged to be grounded. On the one hand, a wire is led out from a fixed end of the third group of pins 43 and the first housing 1 to be connected to a magnet yoke of the stator assembly 110, and a grounding end of the circuit board assembly 130 is electrically connected to the magnet yoke of the stator assembly 110 through the third group of pins 43, thus improving the electro magnetic compatibility (EMC) of the electrically operated valve; and on the other hand, the third group of pins 43 are electrically connected to the circuit board assembly 130 and the valve body 150 so as to connect a ground plane of the circuit board assembly 130 to the valve body 150, thereby improving EMC interference of the circuit board assembly 130.

Figure 12:
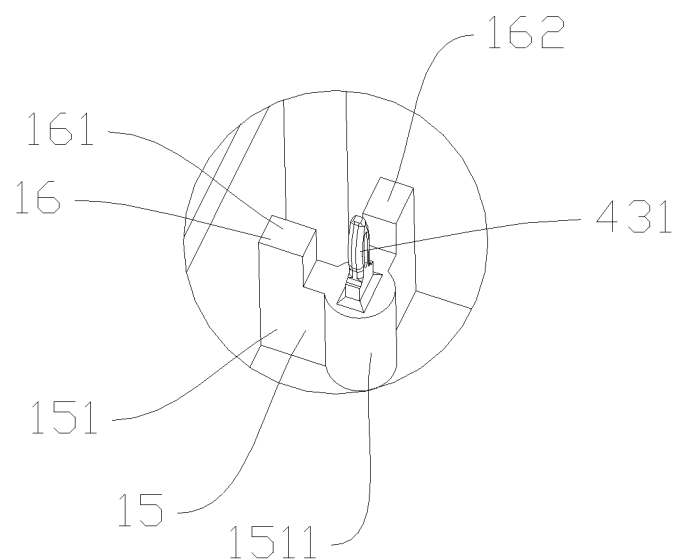
FIG. 12 is an enlarged schematic view showing a structure of a portion B in FIG. 7.

In this embodiment, the circuit board assembly 130 is limited by the pin 4, and one end surface of the circuit board assembly 130 is limited by the base 15 integrally formed with the first housing 1; wherein a height of the base 15 is relatively greater than heights of the first protruding portion 18, the second protruding portion 1104 and the third protruding portion 1105, which facilitates sufficient connection of the circuit board assembly 130 to the pin 4. Referring to FIG. 7, FIG. 10, FIG. 12, FIG. 13 and FIG. 14, the first housing 1 includes the base 15, the base 15 is formed protruding from the bottom wall 11 of the box body 180, the base 15 includes a limiting portion 16, and the base 15 is divided into a first base 151, a second base 152, a third base 153, a fourth base 154 according to different arrangement positions. The first base 151 and the second base 152 are disposed close to the third side wall 113, the first base 151 is disposed close to the second side wall 112, the second base 152 is disposed close to the fourth side wall 114, the third base 153 and the fourth base 154 are disposed close to the first side wall 111, the third base 153 is disposed close to the fourth side wall 114, and the fourth base 154 is disposed close to the second side wall 112, where the first base 151 and the second base 152 have a same structure, and the third base 153 and the fourth base 154 have a same structure, such arrangement can be convenient for processing, and of course, different structures may also be used. Referring to FIG. 12, the first base 151 includes the limiting portion 16 and a first columnar portion 1511, the limiting portion 16 includes a first limiting portion 161 and a second limiting portion 162, the first limiting portion 161 and the second limiting portion 162 are spaced apart from each other a predetermined distance, a plane where an upper end of the first limiting portion 161 is located and a plane where an upper end of the second limiting portion 162 is located are in a same plane, the first columnar portion 1511 is separately connected to the first limiting portion 161 and the second limiting portion 162, the third fixing portion 435 of the eighth pin 431 is fixed to the first columnar portion 1511 by injection molding, the first columnar portion 1511 covers a portion of the third fixing portion 435, a plane where an upper end of the first columnar portion 1511 is located is relatively lower than the plane where the upper end of the first limiting portion 161 is located, and a top end of the eighth pin 431 is relatively higher than a plane where the first limiting portion 161 is located, so that after the eighth pin 431 is connected to the circuit board assembly 130 by press-fitting, the first limiting portion 161 and the second limiting portion 162 can abut against a lower end surface of the circuit board assembly 130, thereby restricting the circuit board assembly 130 to continue to move toward the bottom wall 11 of the first housing 1; and meanwhile, the first columnar portion 1511 covers the eighth pin 431 by a preset length, facilitating improvement of the connection strength of the eighth pin 431, improving the stability of the force under press fitting, and improving the stability of the structure. The second base 152 has a same structure as the first base 151 and includes a limiting portion and a second columnar portion, the limiting portion includes a third limiting portion and a fourth limiting portion, a plane where an upper end of the second columnar portion is located is relatively lower than a plane where an upper end of the third limiting portion is located, and the ninth pin 432 is fixed to the second columnar portion of the second base 152 by injection molding and has a same positional relationship as the eighth pin, which will not be repeated herein.

Figure 13:
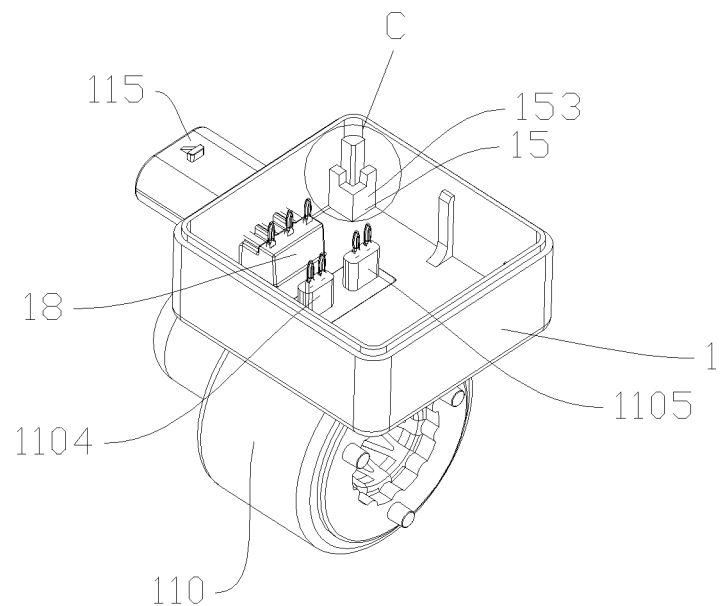
FIG. 13 is a schematic view from another viewing angle of a combined structure of a stator assembly and a first housing.
Figure 14:
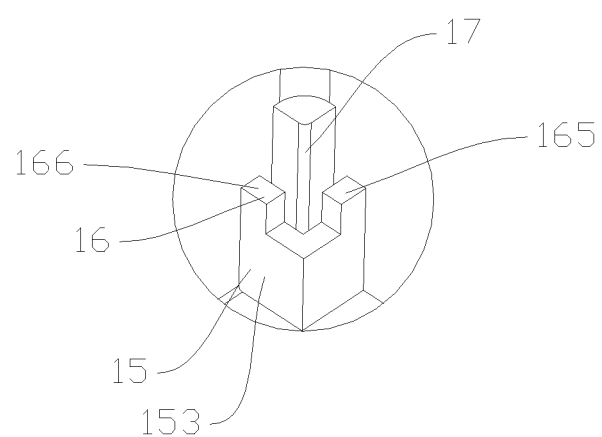
FIG. 14 is an enlarged schematic view showing a structure of a portion C in FIG. 13.

Referring to FIG. 13 and FIG. 14, the third base 153 includes a fifth limiting portion 165 and a sixth limiting portion 166 which are spaced apart from each other a predetermined distance, after the circuit board assembly 130 is assembled, the lower end surface of the circuit board assembly 130 abuts against the fifth limiting portion 165 and the sixth limiting portion 166 so as to define the circuit board assembly 130 to continue to move toward the bottom wall 11 of the first housing 1; and the fourth base 154 has a same structure as the third base 153 and includes a seventh limiting portion and an eighth limiting portion, and specific structures of the seventh limiting portion and the eighth limiting portion will not be repeated herein.

The first housing 1 is further provided with a guide rib 17, the guide rib 17 is disposed between the third base 153 and the side wall of the first housing 1, the guide rib 17 and the side wall of the first housing 1 are integrally formed, a height of the guide rib 17 is greater than a height of the third base 153, the circuit board assembly 130 is provided with a notch portion 137 matched with the guide rib 17, and a part of the guide rib 17 is configured to stick into the notch portion 137. In this embodiment, one guide rib 17 is provided and the one guide rib 17 is disposed on an inner periphery of the third base 153, the guide rib 17 is disposed between the third base 153 and the side wall of the first housing, the guide rib 17 is disposed on an inner side of the side wall of the first housing 1, so that other positions of the first housing 1 does not need to be occupied and the space of the first housing 1 is effectively utilized. A relative height of the guide rib 17 is greater than a height of the third base 153, so that guidance is formed above the base 16, and the positioning is more accurate. Of course, the guide rib 17 may also be disposed inside the first base 151, the second base 152, and the fourth base 154. The circuit board assembly 130 is further provided with the notch portion 137 matched with the guide rib 17, and the guide rib 17 serves as an installation guide for the circuit board assembly 130, so that the positioning and guidance of the circuit board assembly 130 during installation can be better facilitated, the assembly efficiency can be improved, and erroneous installation of the assembly of the circuit board assembly 130 can be prevented. The number of guide ribs 17 includes, but is not limited to, one, and may be appropriately increased as required.

Figure 15:
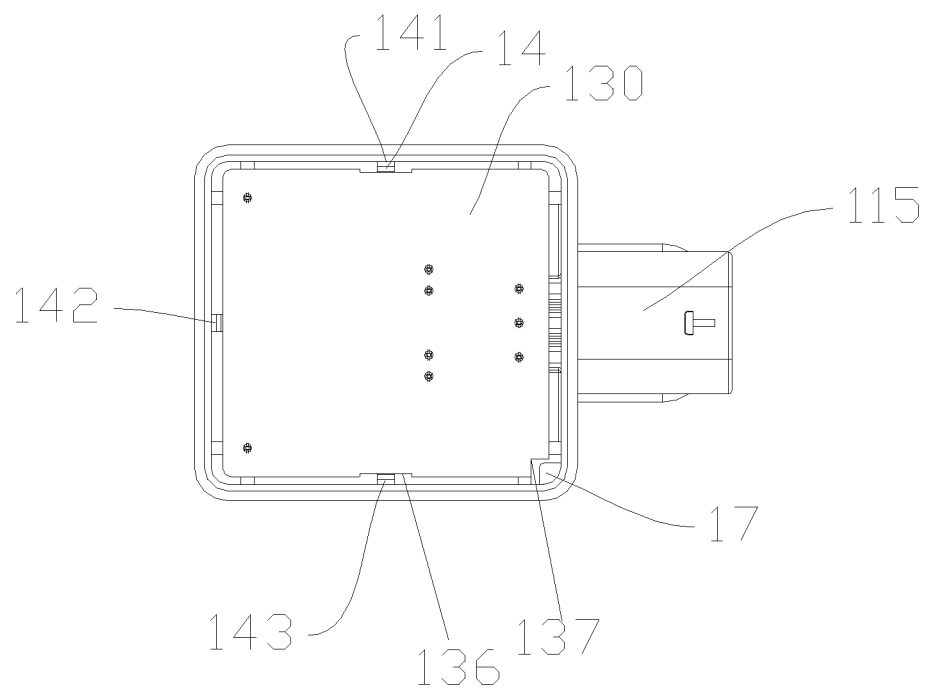
FIG. 15 is a front structure view of a combined structure of a circuit board assembly, a stator assembly and a first housing.

Referring to FIG. 3, FIG. 10 and FIG. 15, the first housing 1 further includes a positioning rib 14, the positioning rib 14 and the side wall of the first housing 1 are integrally formed, the positioning rib 14 is configured to protrude from at least one of the second side wall 112, the third side wall 113 or the fourth side wall 114 to the cavity 3 of the first housing 1, the circuit board assembly 30 is provided with a groove structure 136, and a part of the positioning rib 14 is configured to stick into the groove structure 136. A height of the positioning rib 14 is greater than a height of the base 15, and the positioning rib 14 is divided into a first positioning rib 141, a second positioning rib 142 and a third positioning rib 143 according to different arrangement positions. The first positioning rib 141 is disposed inside the second side wall 112, the second positioning rib 142 is disposed inside the third side wall 113, the third positioning rib 143 is disposed inside the fourth side wall 114, and the positioning rib 14 protrudes from the side wall to the cavity 3 of the first housing 1. Meanwhile, the circuit board assembly 130 is provided with the groove structure 136 matched with the first positioning rib 141, the second positioning rib 142, and the third positioning rib 143. In one embodiment, the groove structure 136 may not be provided, and the outer edge of the circuit board assembly 130 abuts against the positioning rib 14. After the circuit board assembly 130 is installed, the circuit board assembly 130 abuts against the positioning rib 14 or is in clearance fit with the positioning rib 14, which can better facilitate the guidance when the circuit board assembly 130 is installed and ensure that the pin is aligned with the connection holes of the circuit board assembly 130, thereby improving the assembly efficiency.

Referring to FIG. 1 and FIG. 2, the electrically operated valve 100 of this embodiment further includes a waterproof and breathable membrane 5 and a communication passage 50, so that air in the cavity 3 of the box body 180 can be discharged out of the cavity 3 through the waterproof and breathable membrane 5 and the communication passage 50, the water vapor in the cavity 3 can also be discharged out of the box body 180 through the waterproof and breathable membrane 5 and the communication passage 50, and when external air enters the cavity 3 through the waterproof and breathable membrane 5, the waterproof and breathable membrane 5 can isolate the water vapor in the outside air. With such configuration, external water vapor cannot enter that cavity through the waterproof and breathable membrane 5, and thus the interior environment of the cavity 3 can be kept relatively dry. In this way, condensation in the air in the cavity 3 due to temperature change in a relatively high humidity environment can be prevented, and damage to the circuit board assembly 130 and the like caused by the condensation can be prevented. Meanwhile, relative balance of internal and external pressures of the box body 180 can be ensured, and contaminated particles in the external air can also be isolated.

Figure 24:
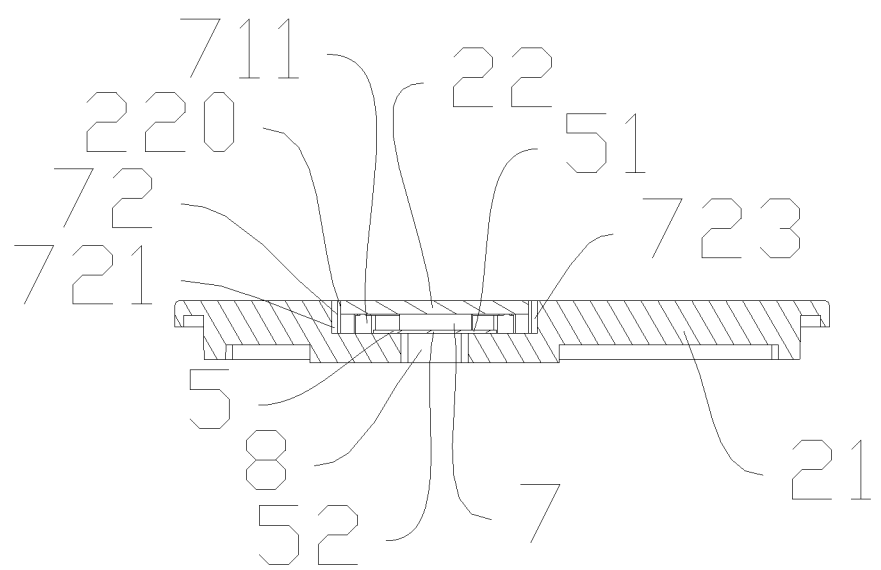
FIG. 24 is a cross-sectional structure view of the second housing of FIG. 22.

As shown in FIG. 24, the waterproof and breathable membrane 5 includes a fixed connection portion 51 and a ventilation portion 52, the fixed connection portion 51 is disposed around the ventilation portion 52, and the fixed connection portion 51 is fixed to the box body 180 by hot-pressing, welding or fixing glue. In this way, the gas cannot be communicated with the inside and the outside of the cavity 3 through the fixed connection portion 51, but only through the ventilation portion 52, so that water outside the cavity 3 is prevented from entering the cavity 3 through the fixed connection portion 51.

Figure 16:
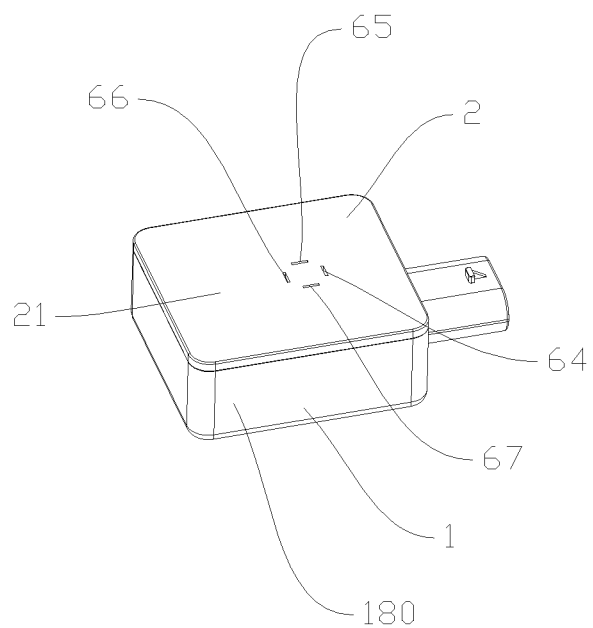
FIG. 16 is a structure view of a box body according to a first embodiment.

FIG. 16 is a first embodiment of the box body 180. In this embodiment, the box body 180 includes a first housing 1 and a second housing 2, the first housing 1 is fixedly connected to the second housing 2 by welding, and a joint between the first housing 1 and the second housing 2 is sealed, where the first housing 1 is the same as the above-mentioned first housing 1, which will not be repeated herein, and the second housing 2 will be emphatically described below.

In conjunction with FIG. 17, the second housing 2 includes a base plate 21, the box body 180 further includes the waterproof and breathable membrane 5 and the communication passage 50, the waterproof and breathable membrane 5 is fixed in contact with the box body 180, the cavity 3 is communicated with the outside of the box body 180 through the waterproof and breathable membrane 5 and the communication passage 50, the waterproof and breathable membrane 5 is fixed to the second housing 2, the second housing 2 includes the communication passage 50 and a first concave portion 6, the first concave portion 6 is recessed from the cavity 3 to the outside of the second housing 2, the communication passage 50 is communicated with the first concave portion 6, the waterproof and breathable membrane 5 is accommodated in the first concave portion 6 and fixedly arranged, the cavity 3 is disposed at a first side of the waterproof and breathable membrane, and the communication passage 50 is disposed at a second side of the waterproof and breathable membrane. In this embodiment, the waterproof and breathable membrane 5 is fixed on an inner side of the base plate 21, and a joint between the waterproof and breathable membrane 5 and the base plate 21 is sealed. For example, the waterproof and breathable membrane 5 may be fixed to and sealed with the base plate 21 by hot-pressing or welding, and the welding mode may be ultrasonic welding. In one embodiment, the waterproof and breathable membrane 5 may also be fixed to and sealed with the base plate 21 by fixing glue. In other embodiments, the waterproof and breathable membrane 5 may also be fixed to the base plate 21 in other ways. The base plate 21 has the communication passage 50, and the outside of the box 180 is kept in gas communication with the inside of the cavity 3 through the communication passage 50 and the waterproof and breathable membrane 5. Voids and materials of the waterproof and breathable membrane 5 are design to ensure that water from the outside cannot enter the cavity 3 through the waterproof and breathable membrane 5, while the outside is kept in gas communication with the box body 180. In this embodiment, the waterproof and breathable membrane 5 is made of a material having waterproof and breathable functions. In this embodiment, a main component of a material of the waterproof and breathable membrane 5 is expanded polytetrafluoroethylene (EPTFE), and other materials having similar functions may also be used in one embodiment.

The base plate 21 includes the outer edge portion 201, the first limiting rib 202, and the overflow groove 203, the overflow groove 203 is formed between the outer edge portion 201 and the first limiting rib 202, after the first housing 1 and the second housing 2 are assembled, the welding rib 12 is disposed in the overflow groove 203, and the outer side of the first limiting rib 202 abuts against the inner side of the side wall of the first housing 1.

For ease of description, a surface of the base plate 21 which is relatively facing away from the circuit board assembly 130 is referred to as a first surface 211, a surface of the base plate 21 which is relatively facing towards the circuit board assembly 130 is referred to as a second surface 212, and the waterproof and breathable membrane 5 is disposed on the second surface 212.

Figure 19:
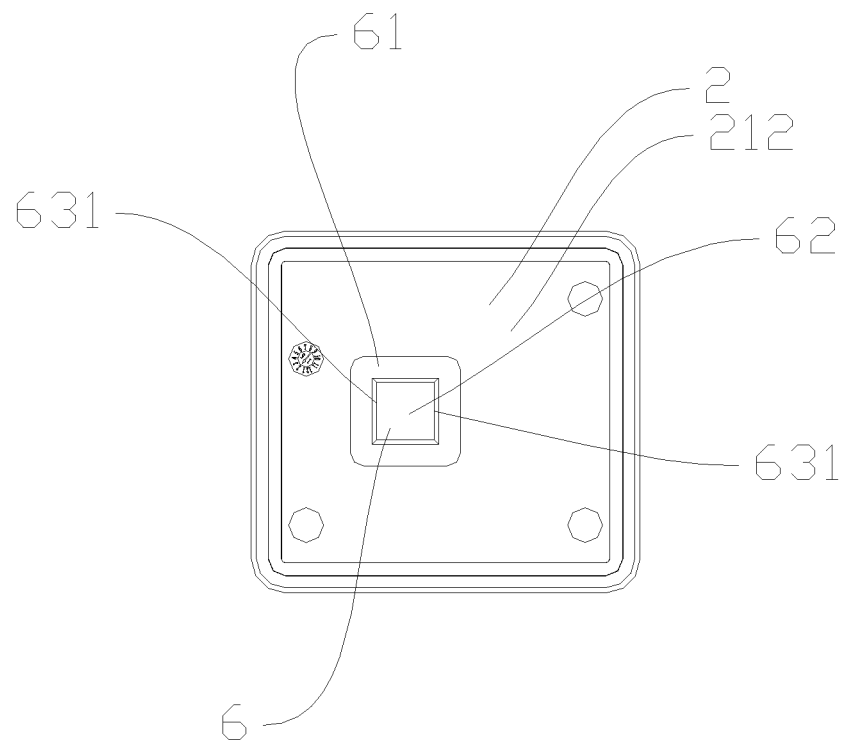
FIG. 19 is a structure view of the second housing of FIG. 16 from another viewing angle.
Figure 20:
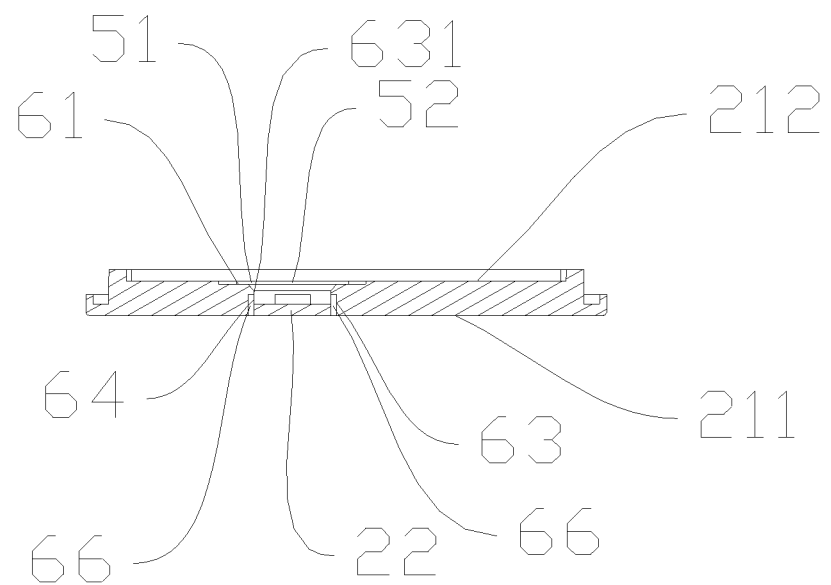
FIG. 20 is a cross-sectional structure view of the second housing of FIG. 17.
Figure 21:
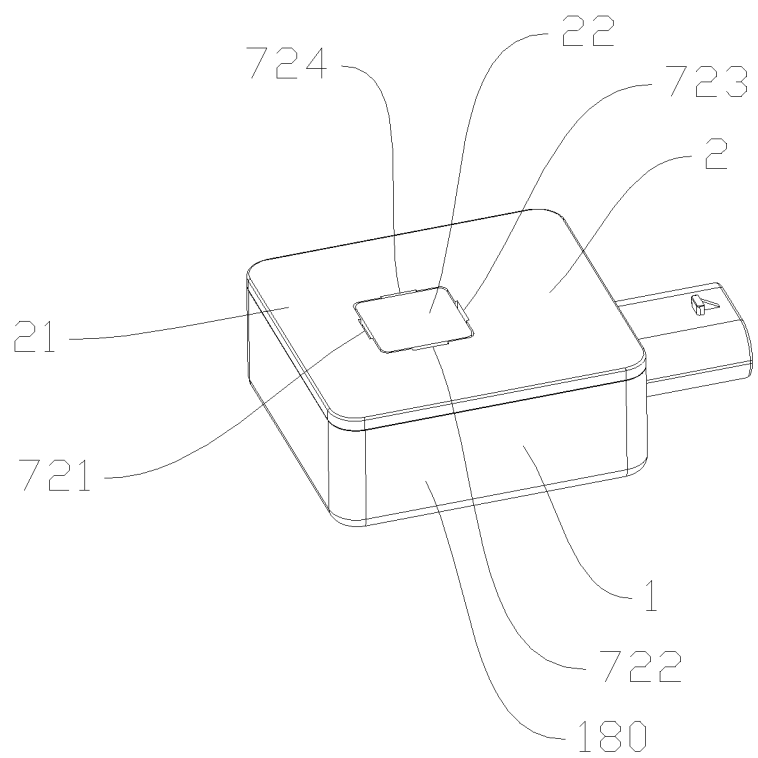
FIG. 21 is a structure view of a box body according to a second embodiment.

Referring to FIG. 19 and FIG. 20, the base plate 21 includes the first concave portion 6, the first surface 211 and the second surface 212, the first concave portion 6 is recessed from the second surface 212 to the first surface 211, the first concave portion 6 is communicated with the communication passage 50, the second housing 2 includes a first bottom wall 61, a second bottom wall 62 and a side wall 63 of the first concave portion 6 which form the first concave portion 6, the first bottom wall 61 and the second bottom wall 62 are arranged in a stepped manner, the side wall 63 of the first concave portion 6 is disposed between the first bottom wall 61 and the second bottom wall 62, the second bottom wall 62 is disposed lower than the first bottom wall 61, the communication passage 50 is formed on the second bottom wall 62, the waterproof and breathable membrane 5 is fixed to the first bottom wall 61 and separates the first concave portion 6 into a first cavity and a second cavity, the second cavity is communicated with the communication passage 50, and the first cavity is communicated with the cavity 3.

In one embodiment, the first bottom wall 61 and the second bottom wall 62 are spaced apart from each other a predetermined distance, the waterproof and breathable membrane 5 is fixed to the first bottom wall 61, a plane where the first bottom wall 61 is located is relatively lower than a plane where the first surface 211 is located, a part of the waterproof and breathable membrane 5 is in contact with the first bottom wall 61, and a periphery of the waterproof and breathable membrane 5 is fixed to and sealed with the first bottom wall 61 by hot-pressing or welding, and the welding method may be the ultrasonic welding. In one embodiment, the periphery of the waterproof and breathable membrane 5 may also be fixed to and sealed with the first bottom wall 61 by the fixing glue, so as to ensure waterproof performance and strength and tightness of a welding portion; and meanwhile, the plane where the first bottom wall 61 is located is lower than the plane where the first surface 211 is located, and the waterproof and breathable membrane 5 is substantially flush with the second surface 212 or relatively lower than the second surface 212 after the waterproof and breathable membrane 5 is fixed and connected by hot-pressing, welding, or the fixing glue, thereby preventing the waterproof and breathable membrane 5 from protruding from the plane where the second surface 212 is located after the waterproof and breathable membrane 5 is installed, and preventing the waterproof and breathable film 5 from being damaged by touching. In one embodiment, a position of the waterproof and breathable membrane may further be arranged in advance to simplify the process of determining an installation position. In other embodiments, the waterproof and breathable membrane 5 may also be disposed protruding from the second surface 212.

Figure 18:
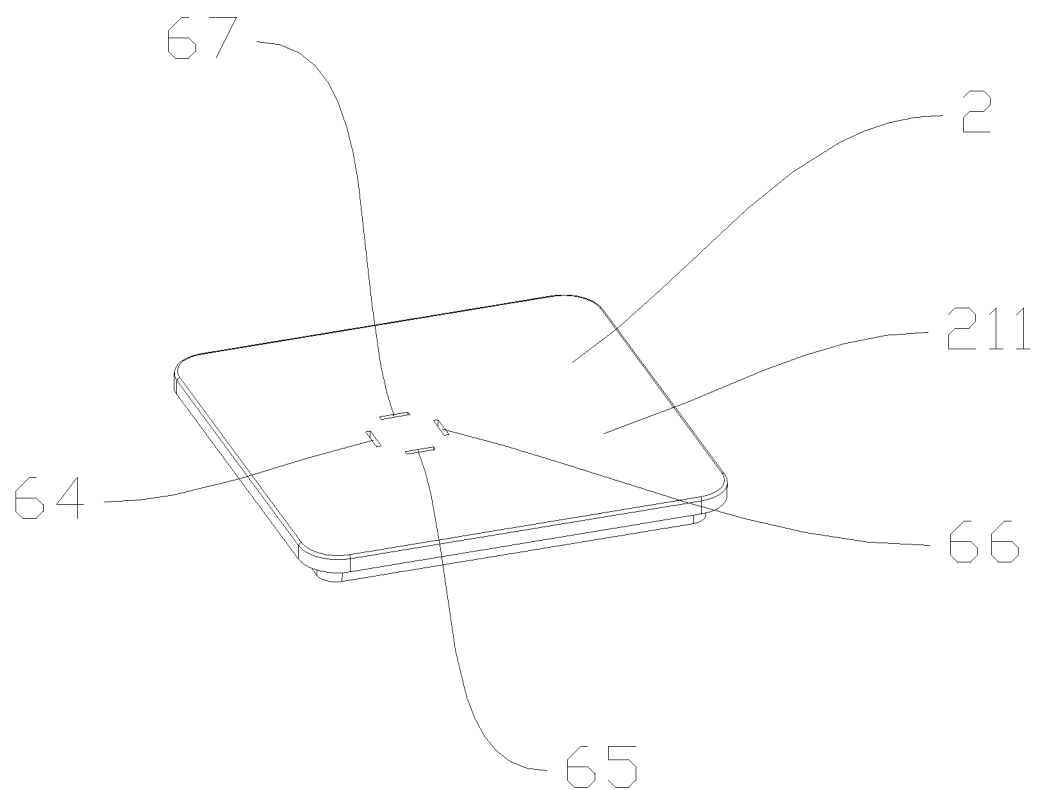
FIG. 18 is a structure view of the second housing of FIG. 16 from one viewing angle.

In this embodiment, as shown in FIG. 18 to FIG. 20, the communication passage 50 includes a first portion, the first portion includes a first groove 64, a second groove 65, a third groove 66 and a fourth groove 67, the first groove 64, the second groove 65, the third groove 66 and the fourth groove 67 are recessed from an outer surface of the second housing 2 toward an inner surface of the second housing 2, the first groove 64, the second groove 65, the third groove 66 and the fourth groove 67 have a same structure and are disposed around the first concave portion 6, and the first groove 64, the second groove 65, the third groove 66 and the fourth groove 67 are separately communicated with the first concave portion 6. The first concave portion 6 further includes a shielding portion disposed protruding from the side wall of the first concave portion, a protruding height of the shielding portion 631 is greater than a width of the communication passage 50, and the shielding portion 631 is disposed at a setting distance from the second bottom wall 62. In one embodiment, the second housing 2 includes the shielding portion 631, the shielding portion 631 protrudes from the side wall 63 of the first concave portion 6 toward the cavity formed by the first concave portion 6, the protruding height of the shielding portion 631 is relatively greater than or equal to widths of the first groove 64, the second groove 65, the third groove 66, and the fourth groove 67 of the communication passage 50, a lowest end of the shielding portion 631 is disposed at a setting distance from the second bottom wall 62. Such the shielding portion 631 makes flow passages form a labyrinth structure, which reduces a gap of the communication passage 50 and reduces external foreign matters entering the first concave portion 6 on the premise of ensuring flow, thereby reducing damage to the waterproof and breathable membrane 5 caused by foreign matters directly contacting the waterproof and breathable membrane 5. In one embodiment, angles between opening directions of grooves of the first groove 64, the second groove 65, the third groove 66 and the fourth groove 67 and the first surface 211 may be less than 90 or greater than 90, that is, extending directions of the first groove 64, the second groove 65, the third groove 66 and the fourth groove 67 are not perpendicular to the first surface 211, and the damage to the waterproof and breathable membrane 5 caused by foreign matters directly contacting the waterproof and breathable membrane 5 may also be reduced. The arrangement of the first groove 64, the second groove 65, the third groove 66 and the fourth groove 67 allows sufficient space in the communication passage 50, thereby ensuring a flow area of the air. By providing the waterproof and breathable membrane 5, the air in the cavity 3 of the box body 180 can be discharged out of the box body 180 through the waterproof and breathable membrane 5, the water vapor in the cavity 3 can be discharged out of the box body 180 through the waterproof and breathable membrane 5, and when external air enters the cavity 3 through the waterproof and breathable membrane 5, the waterproof and breathable membrane 5 can isolate the water vapor in the external air, so that external water vapor cannot enter that cavity through the waterproof and breathable membrane 5, and thus the interior environment of the cavity 3 can be kept relatively dry. In this way, condensation in the air in the cavity 3 due to temperature change in a relatively high humidity environment can be prevented, and damage to the circuit board assembly 130 and the like caused by condensation can be prevented. Meanwhile, relative balance of internal and external pressures of the box body 180 can be ensured. In addition, external liquid molecules and contaminated particles can also be prevented from entering the cavity 3 through the waterproof and breathable membrane 5, thereby playing a role of waterproof and foreign matter prevention, and preventing water and foreign matter particles from damaging the circuit board assembly and the like. In one embodiment, the waterproof and breathable membrane 5 may also be mounted on the first housing 1 as required. When the electrically operated valve 100 is applied, the first concave portion 6 may be disposed relatively obliquely or relatively downward to prevent water from accumulating in the first concave portion 6. In another paraphrase, the first concave portion 6 has the side wall 63 of the first concave portion 6, the communication passage 50 includes the first groove 64, the second groove 65, the third groove 66 and the fourth groove 67, the first groove 64, the second groove 65, the third groove 66 and the fourth groove 67 are recessed outwardly from the side wall 63 of the first concave portion 6, and the first groove 64, the second groove 65, the third groove 66 and the fourth groove 67 do not penetrate the first housing 1.

FIG. 21 to FIG. 24 show a second embodiment of the box body. Compared with the first embodiment, this embodiment has a major difference in the second housing 2. In this embodiment, the second housing 2 includes a base plate 21 and a cover plate 22, the base plate 21 and the cover plate 22 are separately formed and fixedly connected to each other, a communication passage is disposed between the base plate 21 and the cover plate 22, and the box body 180 is provided with a waterproof and breathable membrane 5, and in this embodiment, the waterproof and breathable membrane 5 is installed between the base plate 21 and the cover plate 22. In this embodiment, the base plate 21 and the cover plate 22 are separately injection molded and fixedly connected to each other by welding or clamping, and the welding method may be ultrasonic welding.

The communication passage 50 is a gap between the base plate 21 and the cover plate 22, and the outside of the box 180 is kept in gas communication with the inside of the cavity 3 through the communication passage 50 and the waterproof and breathable membrane 5. Voids and materials of the waterproof and breathable membrane 5 are designed to ensure that water from the outside cannot enter the box body 180 through the waterproof and breathable membrane 5, while the outside is kept in gas communication with the cavity 3. In this embodiment, the waterproof and breathable membrane 5 is made of a material having waterproof and breathable functions. In this embodiment, a main component of a material of the waterproof and breathable membrane 5 is expanded polytetrafluoroethylene (EPTFE), and of course, other materials having similar functions may also be used.

Figure 23:
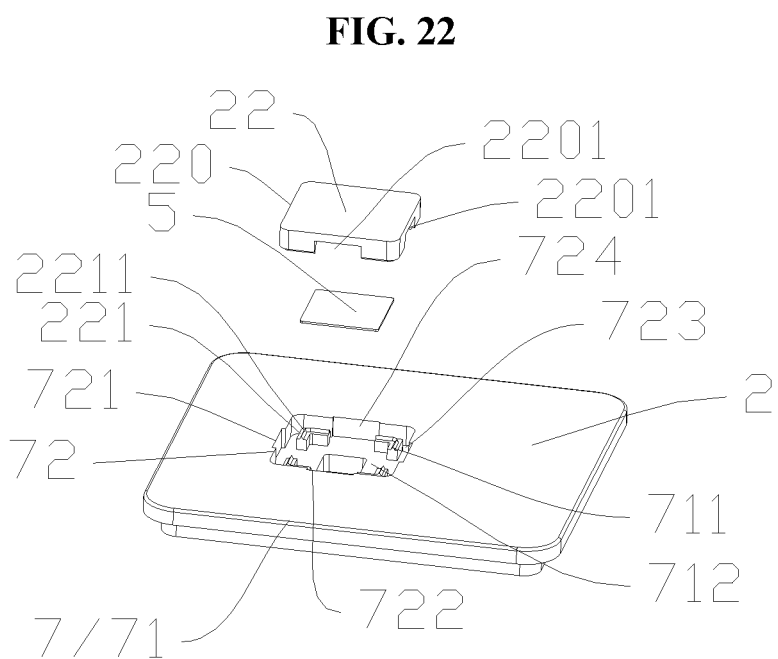
FIG. 23 is an exploded structure view of the second housing of FIG. 22.

Referring to FIG. 23, the base plate 21 includes a second concave portion 7 and a first through-hole portion 8, the second concave portion 7 is recessed from the outside of the second housing 2 to the cavity 3, the second concave portion 7 is communicated with the cavity 3 through the first through-hole portion 8, the second concave portion 7 includes a side wall 72 of the second concave portion 7 and a bottom 71 of the second concave portion 7, and the bottom 71 of the second concave portion 7 and the side wall 72 of the second concave portion 7 surround an inner cavity of the second concave portion 7. The first through-hole portion 8 penetrates through the bottom of the second concave portion 7, and the fixed connection portion 51 of the waterproof and breathable membrane 5 is fixed to the bottom 71 of the second concave portion 7. The second housing 2 further includes a first welding portion 711, the first welding portion 711 is disposed protruding from the bottom 71 of the second concave portion 7, the first welding portion 711 is spaced a setting distance from the side wall 72 of the second concave portion 7, the cover plate 22 and the base plate 21 are welded and fixed through the first welding portion 711, a first mounting portion 712 is disposed between the first welding portion 711 and the first through-hole portion 8, and a periphery of the waterproof and breathable membrane 5 is in contact with and fixed to the first mounting portion 712. In one embodiment, the bottom 71 of the second concave portion 7 has the first welding portion 711, the first welding portion 711 protrudes from the bottom 71 of the second concave portion 7, and the first welding portion 711 is disposed close to the side wall 72 of the second concave portion 7 and is spaced a setting distance from the side wall 72 of the second concave portion 7. In this embodiment, four first welding portions 711 are provided and the four first welding portions 711 are spaced apart from each other a predetermined distance, the periphery of the waterproof and breathable membrane 5 is in contact with the first mounting portion 712 and is fixed to and sealed with the first mounting portion 712 by hot-pressing or welding, and the welding method may be ultrasonic welding. In one embodiment, the periphery of the waterproof and breathable membrane 5 may also be fixed to and sealed with the first mounting portion 712 by fixing glue, the first welding portion 711 has a first rib portion 2211 disposed protruding from a top of the first welding portion 711, a cross-sectional area of the first rib portion 2211 gradually increases downward from the top, and the first rib portion 2211 is welded to the cover plate 22. Such arrangement, on the one hand, facilitates improvement of the connection strength between the first rib portion 2211 and the first welding portion 711; and on the other hand, the top of the first rib portion 2211 is in contact with the cover plate 22, and since a cross section of the top of the first rib portion 2211 is relatively small, less energy is required to fuse and weld the first rib portion 2211, which is beneficial to saving energy and reducing influence on the cover plate 22 and other parts of the box body 180. The cover plate 22 includes a circumferential side portion 220, a part of the side wall 72 of the second concave portion 7 is in an abutment fit or a small clearance fit with the circumferential side portion 220, and the communication passage 50 is formed between the part of the side wall 72 of the second concave portion 7 and the circumferential side portion 220. The communication passage 50 includes a first portion and a second portion, and at least one of the side wall 72 of the second concave portion 7 or the circumferential side portion 220 has a groove. The groove is formed by recessing on at least one of the side wall 72 of the second concave portion 7 or the circumferential side portion 220, and a length of the groove is less than a length of the cover plate 22 and is greater than or equal to one third of the length of the cover plate 22. The second portion includes a notch 2201 disposed on the circumferential side portion 220 of the cover plate 22 and mated with the groove, and further includes a gap formed by the cover plate 22 and the base plate 21 through the notch 2201. The first portion includes a gap formed by at least one of the side wall of the second concave portion or the circumferential side portion through the groove. The groove includes a fifth groove 721, a sixth groove 722, a seventh groove 723 and an eighth groove 724. The fifth groove 721, the sixth groove 722, the seventh groove 723 and the eighth groove 724 are recessed from at least one of the side wall of the second concave portion 72 or the circumferential side portion 220. Lengths of the fifth groove 721, the sixth groove 722, the seventh groove 723, and the eighth groove 724 are less than the length of the cover plate 22 and greater than or equal to one third of the length of the cover plate 22. The second portion includes notches 2201 disposed on the circumferential side portion 220 of the cover plate 22 and fitted with the fifth groove 721, the sixth groove 722, the seventh groove 723, and the eighth groove 724. The first portion is communicated with the second portion, and the lengths of the fifth groove 721, and the sixth groove 722, the seventh groove 723, and the eighth groove 724 are less than the length of the cover plate 22 and are greater than or equal to one third of the length of the cover plate. In this way, a labyrinth structure is formed under the condition that the flow passage is ensured, thereby avoiding damage to the waterproof and breathable membrane 5 caused by foreign matters directly contacting the waterproof and breathable membrane 5. One end, which is connected to the bottom 71 of the second concave portion 7, of the cover plate 22 may also be provided with a welding rib, and the welding rib is configured to be connected to the base plate 21. In this embodiment, the function of the waterproof and breathable membrane 5 is the same as the function of the waterproof and breathable membrane 5 in the first embodiment, which will not be repeated herein. When the electrically operated valve 100 is applied, the second concave portion 7 may be disposed relatively obliquely or relatively downward to prevent water from accumulating in the second concave portion 7. In this embodiment, the fifth groove 721, the sixth groove 722, the seventh groove 723, and the eighth groove 724 are formed in the base plate 21, and the notches 2201 are formed in the cover plate 22, so that the communication passage 50 is formed, and compared with forming the communication passage 50 on the base plate 21 or the cover plate 22 at the same time, this embodiment enables easy forming and simple tooling of the base plate 21 and the cover plate 22.

The first concave portion 6 and the second concave portion 7 mentioned above are to distinguish different embodiments, and the first concave portion 6 and the second concave portion 7 are the concave portion.

What is claimed is:

1. An electrically operated valve, comprising:
   a rotor;
   a stator assembly disposed outside the rotor, wherein the stator assembly comprises a coil assembly;
   a sleeve, configured to isolate the stator assembly from the rotor;
   a valve assembly partially disposed in the sleeve, wherein the valve assembly comprises a spool;
   a box body and a circuit board assembly, wherein the box body has a cavity, the circuit board assembly is accommodated in the cavity, and the box body is disposed at one side of the rotor; and
   a valve port disposed below the stator assembly and the rotor;
   wherein the rotor is configured to drive the spool to move close to or away from the valve port;
   wherein the electrically operated valve further comprises a waterproof and breathable membrane, the box body comprises a communication passage, the waterproof and breathable membrane comprises a fixed connection portion and a ventilation portion, the fixed connection portion is disposed around the ventilation portion, the fixed connection portion is fixed to the box body, and the fixed connection portion is fixed to the box body by hot-pressing, welding or fixing glue; and
   wherein the cavity is configured to communicate with gas outside the box body through the ventilation portion and the communication passage, so that water outside the box body is not able to enter the cavity through the waterproof and breathable membrane, thereby reducing water vapor in the cavity accommodating the circuit board assembly;
   wherein the box body comprises a second housing, the second housing comprises a first concave portion, the communication passage is communicated with the first concave portion, the waterproof and breathable membrane is configured to be accommodated in the first concave portion, and the cavity is disposed at a first side of the waterproof and breathable membrane, and the communication passage is disposed at a second side of the waterproof and breathable membrane;
   wherein the first concave portion comprises a first bottom wall, a second bottom wall and a side wall of the first concave portion, the side wall of the first concave portion is disposed between the first bottom wall and the second bottom wall, the communication passage is formed on the second bottom wall, and the fixed connection portion is fixed to the first bottom wall; and
   wherein the first concave portion further comprises a shielding portion disposed protruding from the side wall of the first concave portion, a protruding height of the shielding portion is greater than a width of the communication passage, and the shielding portion is disposed at a setting distance from the second bottom wall.

2. The electrically operated valve of claim 1, wherein the box body further comprises a first housing, the first housing and the second housing are fixed by welding, and the first housing is fixed to the stator assembly.

3. The electrically operated valve of claim 2, wherein the first concave portion is recessed from the cavity to an exterior of the second housing.

4. The electrically operated valve of claim 3, wherein the first bottom wall and the second bottom wall are arranged in a stepped manner, a plane where the first bottom wall is located is lower than a surface where the second housing is located, the second bottom wall is disposed lower than the first bottom wall, the waterproof and breathable membrane is configured to separate the first concave portion into a first cavity and a second cavity, the second cavity is communicated with the communication passage, and the first cavity is communicated with the cavity.

5. The electrically operated valve of claim 3, wherein the second housing comprises a base plate and a cover plate which are separately formed and fixedly connected to each other, the communication passage is disposed between the base plate and the cover plate, and the fixed connection portion is disposed between the base plate and the cover plate.

6. The electrically operated valve of claim 5, wherein the base plate comprises a second concave portion and a first through-hole portion, the second concave portion is recessed from the exterior of the second housing to the cavity, the second concave portion is communicated with the cavity through the first through-hole portion, the second concave portion comprises a side wall of the second concave portion and a bottom of the second concave portion, the first through-hole portion is configured to penetrate through the bottom of the second concave portion, and the fixed connection portion is fixed to the bottom of the second concave portion.

7. The electrically operated valve of claim 6, wherein the second housing further comprises a first welding portion and a first mounting portion, the first welding portion is disposed protruding from the bottom of the second concave portion, the first welding portion is spaced a setting distance from the side wall of the second concave portion, the cover plate and the base plate are welded and fixed through the first welding portion, the first mounting portion is disposed between the first welding portion and the first through-hole portion, and the fixed connection portion is in contact with and fixed to the first mounting portion.

8. The electrically operated valve of claim 6, wherein the cover plate comprises a circumferential side portion, a part of the side wall of the second concave portion is in an abutment fit or a small clearance fit with the circumferential side portion, and the communication passage is formed between the part of the side wall of the second concave portion and the circumferential side portion.

9. The electrically operated valve of claim 8, wherein the communication passage comprises a first portion and a second portion, and at least one of the side wall of the second concave portion or the circumferential side portion is provided with a groove; the groove is configured to be formed by recessing on the at least one of the side wall of the second concave portion or the circumferential side portion, and a length of the groove is less than a length of the cover plate and is greater than or equal to one third of the length of the cover plate; the first portion comprises a first gap formed by the at least one of the side wall of the second concave portion or the circumferential side portion through the groove; the circumferential side portion of the cover plate has a notch matched with the groove, and the notch is configured to be formed at an end portion of the cover plate; and the second portion comprises a second gap formed by the cover plate and the base plate through the notch.

10. The electrically operated valve of claim 8, wherein a main component of a material of at least the ventilation portion of the waterproof and breathable membrane is expanded polytetrafluoroethylene.

11. The electrically operated valve of claim 1, wherein
the box body comprises a first side wall and a third side wall which are disposed opposite to each other and a second side wall and a fourth side wall which are disposed opposite to each other,
the circuit board assembly comprises a first group of connecting holes, a second group of connecting holes and a third group of connecting holes, and
the electrically operated valve further comprises a plurality of pins, and the plurality of pins comprise:
a first group of pins disposed close to the first side wall, fixed to the box body, and electrically connected to the circuit board assembly; wherein each of the first group of pins comprises a first press-fitting portion, the first press-fitting portion is provided with a first needle eye, and the first press-fitting portion is pressed into a respective one of the first group of connecting holes and electrically connected to the circuit board assembly;
a second group of pins fixed to the stator assembly, wherein the second group of pins are configured to connect the stator assembly and the circuit board assembly, each of the second group of pins comprises a second press-fitting portion, the second press-fitting portion is provided with a second needle eye, and the second press-fitting portion is pressed into a respective one of the second group of connecting holes and electrically connected to the circuit board assembly; and
a third group of pins disposed close to the third side wall and fixed to the box body; wherein a first end of each of the third group of pins is fixedly connected to the box body, a second end of each of the third group of pins is limitedly or fixedly disposed with the circuit board assembly; and wherein each of the third group of pins comprises a third press-fitting portion, and the third press-fitting portion is pressed into a respective one of the third group of connecting holes and fixedly connected to the circuit board assembly;
wherein the second group of pins are disposed between the first group of pins and the third group of pins in a direction from the first side wall to the third side wall, and are configured to be connected to an exterior.

12. The electrically operated valve of claim 11, wherein the box body further comprises a first housing, the first housing and the second housing are fixed by welding; the first side wall, the second side wall, the third side wall and the fourth side wall are disposed on the first housing and the first housing comprises a bottom wall; the first side wall, the second side wall, the third side wall and the fourth side wall extend to one side from the bottom wall; the first group of pins are fixed to the first side wall by injection molding, and the third group of pins are fixed to the first housing by injection molding; the stator assembly comprises a connection and limiting portion, and the second group of pins are fixed to the connection and limiting portion by injection molding; the bottom wall is provided with an opening, the connection and limiting portion is configured to stick into the cavity through the opening; and the connection and limiting portion is fixed to the first housing by welding.

13. The electrically operated valve of claim 12, wherein the box body comprises a base which is formed protruding from a bottom of the box body, each of the first group of pins further comprises a first fixing portion and a first connecting portion, each of the second group of pins comprises a second fixing portion and a second connecting portion, and the first fixing portion and the second fixing portion are fixed to the first housing by injection molding; the electrically operated valve further comprises a plug-in portion which is formed in the first side wall and comprises a plug-in cavity, the first connecting portion sticks into the plug-in cavity, the second connecting portion is electrically connected to the coil assembly; each of the third group of pins comprises a third fixing portion, and a part of the third fixing portion is fixed to at least a part of the base by injection molding or the part of the third fixing portion is fixedly connected to at least the part of the base.

14. The electrically operated valve of claim 13, the base is disposed on the first housing, the base comprises a first base and a second base, the first base and the second base are disposed close to the third side wall, the first base is disposed close to the second side wall, and the second base is disposed close to the fourth side wall; the first base comprises a first columnar portion, a first limiting portion and a second limiting portion, and a plane where an upper end of the first columnar portion is located is relatively lower than a plane where an upper end of the first limiting portion is located and a plane where an upper end of the second limiting portion is located; the second base comprises a second columnar portion and a third limiting portion, and a plane where an upper end of the second columnar portion is located is relatively lower than a plane where an upper end of the third limiting portion is located; the third group of pins comprise two pins, one of the two pins is fixedly connected to the first columnar portion, and the other one of the two pins is fixedly connected to the second columnar portion; and a lower end surface of the circuit board assembly abuts the first limiting portion and the second limiting portion, respectively.

15. The electrically operated valve of claim 14, wherein the second group of pins comprise four pins, the first housing comprises a first protruding portion which is formed by protruding from the bottom wall of the first housing, and the first protruding portion covers a portion of each of the first group of pins by injection molding; the connection and limiting portion comprises a second protruding portion and a third protruding portion, the second protruding portion covers a portion of each of two pins of the second group of pins, and the third protruding portion covers a portion of each of the other two pins of the second group of pins; and the first housing comprises a concave portion which is recessed from an exterior of the first housing to an inner cavity of the first housing.

16. The electrically operated valve of claim 15, wherein the connection and limiting portion comprises a step portion, the step portion is in contact with a part of an outer surface of the first housing, and the step portion is fixed to an outer periphery of the first housing by welding and sealed with the outer periphery of the first housing.

17. The electrically operated valve of claim 15, wherein the first housing comprises a positioning rib, the positioning rib and a side wall of the first housing are integrally formed, the positioning rib is configured to protrude from at least one of the second side wall, the third side wall or the fourth side wall to the inner cavity of the first housing, the circuit board assembly is provided with a groove structure, and a part of the positioning rib is configured to stick into the groove structure.

18. The electrically operated valve of claim 17, wherein the first housing further comprises a guide rib, the guide rib is disposed between the base and the side wall of the first housing, the guide rib and the side wall of the first housing are integrally formed, a height of the guide rib is greater than a height of the base, the circuit board assembly is provided with a notch portion matched with the guide rib, and a part of the guide rib is configured to stick into the notch portion.

19. The electrically operated valve of claim 18, wherein the third press-fitting portion is provided with a third needle eye, and the third group of pins are not electrically connected to the circuit board assembly.

* * * * *